United States Patent
McDonald et al.

(10) Patent No.: US 12,491,187 B2
(45) Date of Patent: Dec. 9, 2025

(54) USE OF MCT1 INHIBITORS TO ENHANCE INSULIN SENSITIVITY

(71) Applicant: H. LEE MOFFIT CANCER CENTER AND RESEARCH INSTITUTE, INC., Tampa, FL (US)

(72) Inventors: Patricia McDonald, Land O Lakes, FL (US); Tracey Bailey, Tampa, FL (US)

(73) Assignee: H. Lee Moffit Cancer Center and Research Institute, Inc., Tampa, FL (US)

(*) Notice: Subject to any disclaimer, the term of this patent is extended or adjusted under 35 U.S.C. 154(b) by 0 days.

(21) Appl. No.: 18/085,883

(22) Filed: Dec. 21, 2022

(65) Prior Publication Data

US 2023/0210855 A1 Jul. 6, 2023

Related U.S. Application Data

(60) Provisional application No. 63/296,680, filed on Jan. 5, 2022.

(51) Int. Cl.
*A61K 31/519* (2006.01)
*A61P 3/10* (2006.01)

(52) U.S. Cl.
CPC .............. *A61K 31/519* (2013.01); *A61P 3/10* (2018.01)

(58) Field of Classification Search
CPC .................................. A61K 31/519; A61P 3/10
See application file for complete search history.

(56) References Cited

PUBLICATIONS

Ariaans et al. Cancer Treatment Reviews 41 (2015) 376-384 (Year: 2015).*
Ryuge et al. JCI Insight. Oct. 2, 20212;6(20) p. 1-17 (Year: 2021).*
Petersen (Sci Rep. Oct. 12, 2017;7(1):13101. p. 1-13) (Year: 2017).*

* cited by examiner

*Primary Examiner* — Kortney L. Klinkel
*Assistant Examiner* — Richard Grant Peckham
(74) *Attorney, Agent, or Firm* — Pabst Patent Group LLP

(57) ABSTRACT

Disclosed herein is a method for promoting insulin sensitivity in a subject that involves administering to the subject a therapeutically effective amount of a composition comprising an monocarboxylate transporter 1 (MCT1) inhibitor. For example, the subject can have or be at risk of developing a metabolic disorder characterized by high blood glucose and low insulin levels, e.g., type 2 diabetes, obesity, non-alcoholic fatty liver disease (NAFLD), non-alcoholic steatohepatitis (NASH) and atherosclerosis. The subject can also have been diagnosed with cancer cachexia or with a cancer, such as a solid tumor or lymphoma.

10 Claims, 19 Drawing Sheets

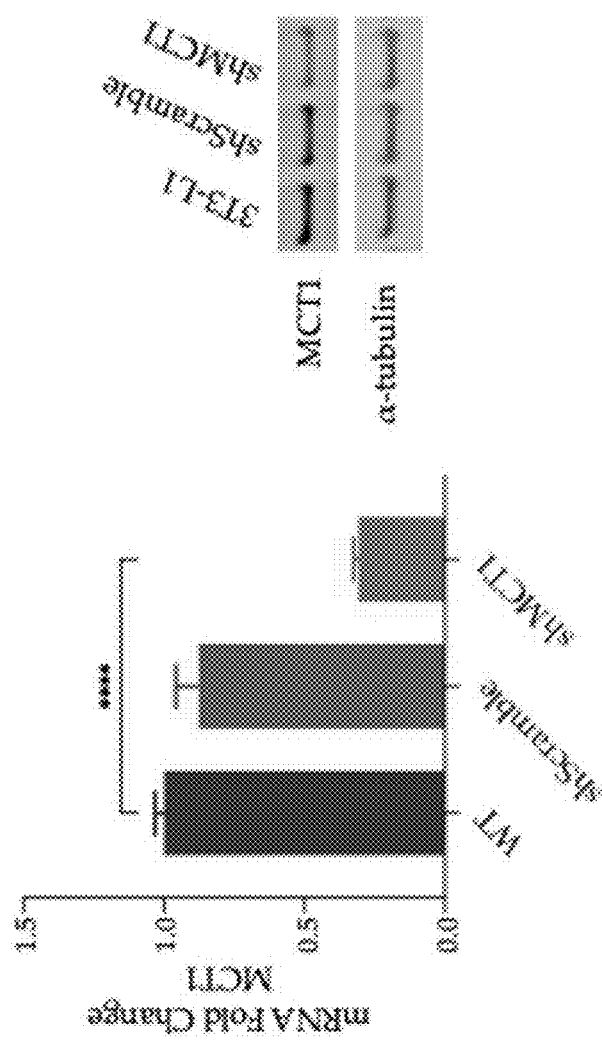
FIG. 1A
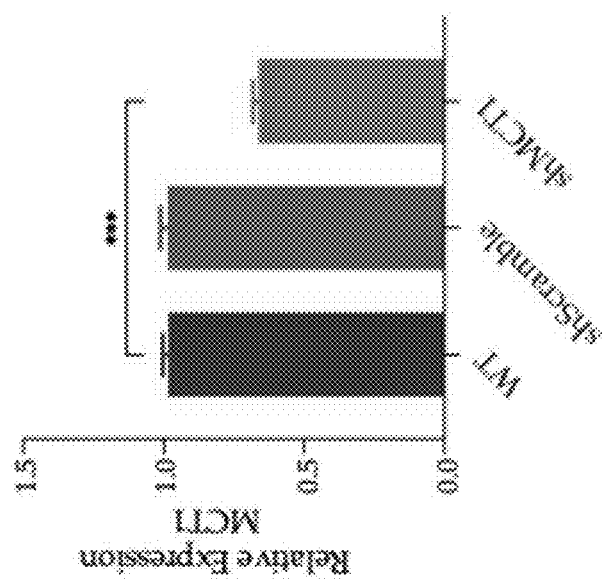
FIG. 1B
FIG. 1C

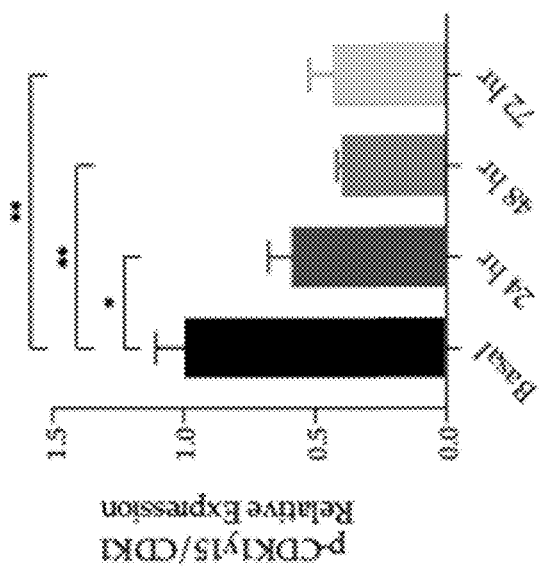
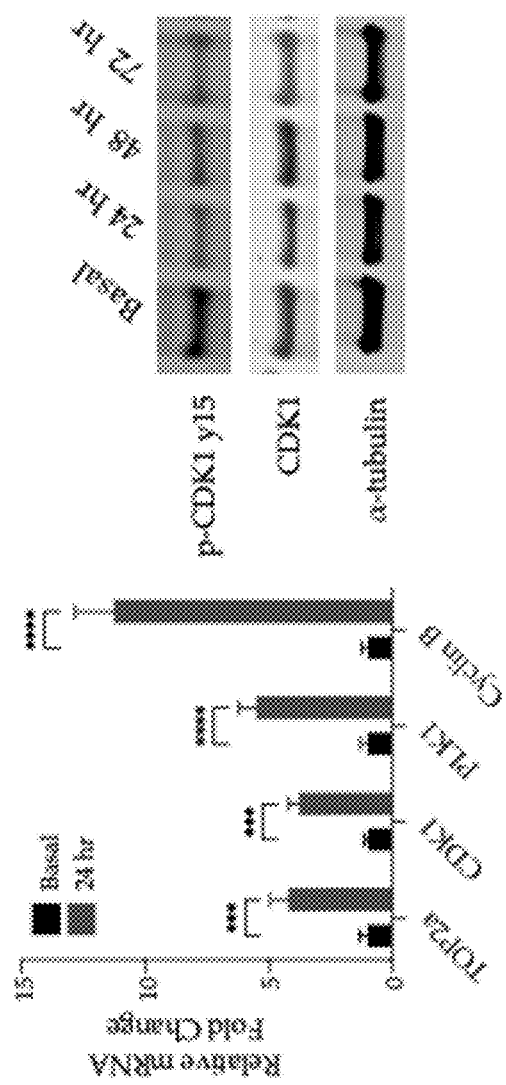
FIG. 4A
FIG. 4B
FIG. 4C

USE OF MCT1 INHIBITORS TO ENHANCE INSULIN SENSITIVITY

CROSS-REFERENCE TO RELATED APPLICATIONS

This application claims benefit of U.S. Provisional Application No. 63/296,680, filed Jan. 5, 2022, which is hereby incorporated herein by reference in its entirety.

BACKGROUND OF THE INVENTION

Enlarged, hypertrophic adipocytes are less responsive to insulin and are a hallmark feature of obesity, contributing to many of the negative metabolic consequences of excess adipose tissue. Although the mechanisms remain unclear, adipocyte size appears to be inversely correlated with insulin sensitivity and glucose tolerance, wherein smaller adipocytes are insulin sensitive, and larger adipocytes develop insulin resistance and exhibit impaired glucose uptake. Thus, pharmacological strategies aimed at regulating adipocyte hypertrophy (increase in adipocyte size) in favor of promoting hyperplasia (increase in adipocyte number) have the potential to improve adipocyte insulin sensitivity and provide therapeutic benefit in the context of metabolic disorders.

SUMMARY OF THE INVENTION

Disclosed herein is a method for promoting insulin sensitivity in a subject that involves administering to the subject a therapeutically effective amount of a composition comprising a monocarboxylate transporter 1 (MCT1) inhibitor.

In some of these embodiments, the subject has or is at risk of developing a metabolic disorder characterized by high blood glucose and low insulin levels, e.g., type 2 diabetes, obesity, non-alcoholic fatty liver disease (NAFLD), non-alcoholic steatohepatitis (NASH) and atherosclerosis. In some embodiments, the subject has been diagnosed with cancer cachexia. In other embodiments, the subject has not been diagnosed with a cancer, such as a solid tumor or lymphoma.

The details of one or more embodiments of the invention are set forth in the accompanying drawings and the description below. Other features, objects, and advantages of the invention will be apparent from the description and drawings, and from the claims.

BRIEF DESCRIPTION OF FIGURES

FIGS. 1A to 1G. Influence of MCT1 inhibition on pre-adipocyte differentiation. (FIG. 1A) cDNA generated from 3T3-L1 (WT), 3T3-L1-shMCT1, and 3T3-L1-shScramble was subjected to RT-qPCR with MCT1 primers (** $p<0.0001$). (FIG. 1B) Cell lysates were subjected to western blot analysis using anti-MCT1 antibodies (* $p<0.001$). (FIG. 1C) Quantification of MCT1 protein expression. (FIG. 1D) Oil Red O staining of 3T3-L1 (WT) cells treated with or without 1 µM AZD3965, 3T3-L1-shMCT1 and 3T3-L1-shScramble during differentiation. Scale bars depict 100 µm. (FIG. 1E) Quantification of Oil Red O staining. (FIG. 1F) Immunoblotting of HSL, PPARγ, and FABP4 in 3T3-L1 (WT) and 3T3-L1-shMCT1 cells undergoing differentiation in the absence or presence of 1 µM AZD3965 at indicated time points. (FIG. 1G) Quantification of HSL, PPARγ, and FABP4 expression on Day 10. (** $p<0.01$) (* $p<0.05$). Values presented represent mean+/−SEM for 3 biological replicates.

(FIG. 2A) Oil Red O staining of differentiated 3T3-L1 (WT) cells treated with or without 1 µM AZD3965 for 24 hr, 48 hr or 72 hr. (FIG. 2B) Quantification of Oil Red O staining (** $p<0.0001$) (* $p<0.001$) (** $p<0.01$). (FIG. 2C) Cell viability of differentiated 3T3-L1 (WT) cells treated with or without 1 µM AZD3965 for 24 hr, 48 hr or 72 hr. (FIG. 2D) Relative intracellular concentrations of NADP+ and NADPH following treatment with or without 1 µM AZD3965 for 24 hr, 48 hr or 72 hr (* $p<0.05$). (FIG. 2E) Intracellular glycerol was quantified following treatment with or without 1 µM AZD3965 for 24 hr, 48 hr or 72 hr. (FIG. 2F) mRNA levels of HSL, PPARγ, and FABP4 in 3T3-L1 cells treated with or without 1 M AZD3965 for 24 hr (** $p<0.01$). (FIG. 2G) Quantifications of immunoblotting experiments showing relative protein expression levels of HSL, PPARγ, and FABP4 in differentiated 3T3-L1 (WT) cells treated with 1 µM AZD3965 for 24 hr. (FIG. 2H) Differentiated adipocytes treated with or without 1 µM AZD3965 for 72 hr. Fresh media was conditioned for 24 hr prior to collection and analysis with an adipokine antibody array. Quantification of the resulting chemiluminescent signals are presented in (H). Values presented represent mean+/−SEM for 3 biological replicates.

(FIG. 3A) Intracellular lactate levels of differentiated adipocytes treated with 1 UM AZD3965 for 15 min-24 hr. (FIG. 3B) Intracellular pyruvate levels of differentiated adipocytes treated with 1 µM AZD3965 for 15 min-24 hr. (FIG. 3C) Following the same treatment paradigm, intracellular NAD+ and NADH were quantified and are presented as a ratio. (FIG. 3D) Significantly altered molecular functions predicted by IPA plotted against significance. (FIG. 3E) Heat map of transcript level changes in DEGs involved in cell cycle. Values presented represent mean+/−SEM for 3 biological replicates.

FIGS. 4A to 4H. Analysis of adipocyte proliferation. (FIG. 4A) RT-qPCR analysis of mRNA levels of indicated genes performed on cDNA of adipocytes differentiated with or without 1 µM AZD3965 for 24 hr (** $p<0.001$), (* $p<0.001$). (FIG. 4B) p-CDK1y15, total CDK1 and α-tubulin expression in cell lysates collected from differentiated 3T3-L1 treated with or without 1 µM AZD3965 for 24 hr, 48 hr, or 72 hr. (FIG. 4C) quantification of relative p-Tyr15-CDK1 expression normalized to total CDK1 and α-tubulin (** $p<0.01$), (* $p<0.05$). (FIG. 4D) Proliferation of differentiated 3T3-L1 cells treated with indicated concentrations of AZD3965 for 24 hr, 48 hr or 72 hr. (FIG. 4E) Assessment of proliferation in preadipocytes, differentiated 3T3-L1, and 3T3-L1-shMCT1 cells treated with the indicated concentrations of AZD3965 for 72 hr. (FIG. 4F) Average pixel area of Ki67 (Cy5) per nuclei was calculated and presented in microns. (FIG. 4G) Fluorescence intensity of Ki67 (Cy5) per nuclei. Values presented represent mean+/−SEM for 3 biological replicates. (FIG. 4H) Differentiated adipocytes treated with or without 1 µM AZD3965 for 24 hr were fixed, stained, and nucleus, Ki67 and lipid droplets visualized using confocal microscopy. DAPI nucleus/DNA staining; Bodipy lipid droplet staining, Ki67 staining. Scale bars depict 10 µm.

(FIG. 5A) 3T3-L1 cells treated with or without 1 µM AZD3965 for 24-72 hr. (FIG.

5B) 3T3-L1 cells treated with (striped bars) or without (solid bars) 175 nM insulin for 30 minutes following incubation (24-72 hr) with 1 μM AZD3965 (** p<0.001), (* p<0.001). (FIG. 5C) Experiment performed in (FIG. 5B) repeated in the presence of 10 μM RO-3306. (FIG. 5D) Non-insulin stimulated glucose uptake levels measured in differentiated 3T3-L1 (WT), 3T3-L1-shMCT1 and 3T3-L1-shScramble cells treated with or without 1 μM AZD3965 for 72 hr. (FIG. 5E) Glucose uptake in 3T3-L1-shMCT1 cells treated with or without 175 nM insulin for 30 minutes following incubation 72 hr incubation with or without 1 μM AZD3965. (FIG. 5F) Glucose uptake levels in 3T3-L1-shScramble cells treated with or without 175 nM insulin for 30 minutes following incubation 72 hr incubation with or without 1 μM AZD3965 (** p<0.01), (* p<0.05). (FIG. 5G) Differentiated adipocytes were treated with or without 1 μM AZD3965 for 24 hr, 48 hr or 72 hr as indicated. Adipocytes were then treated with or with 100 nM insulin for 72 hr. Following the treatment time course, total triglyceride content was assessed and is presented as a fold change normalized to basal (without AZD3965 and without insulin). Values presented represent mean+/−SEM for 3 biological replicates.

DETAILED DESCRIPTION

Figure 1D:
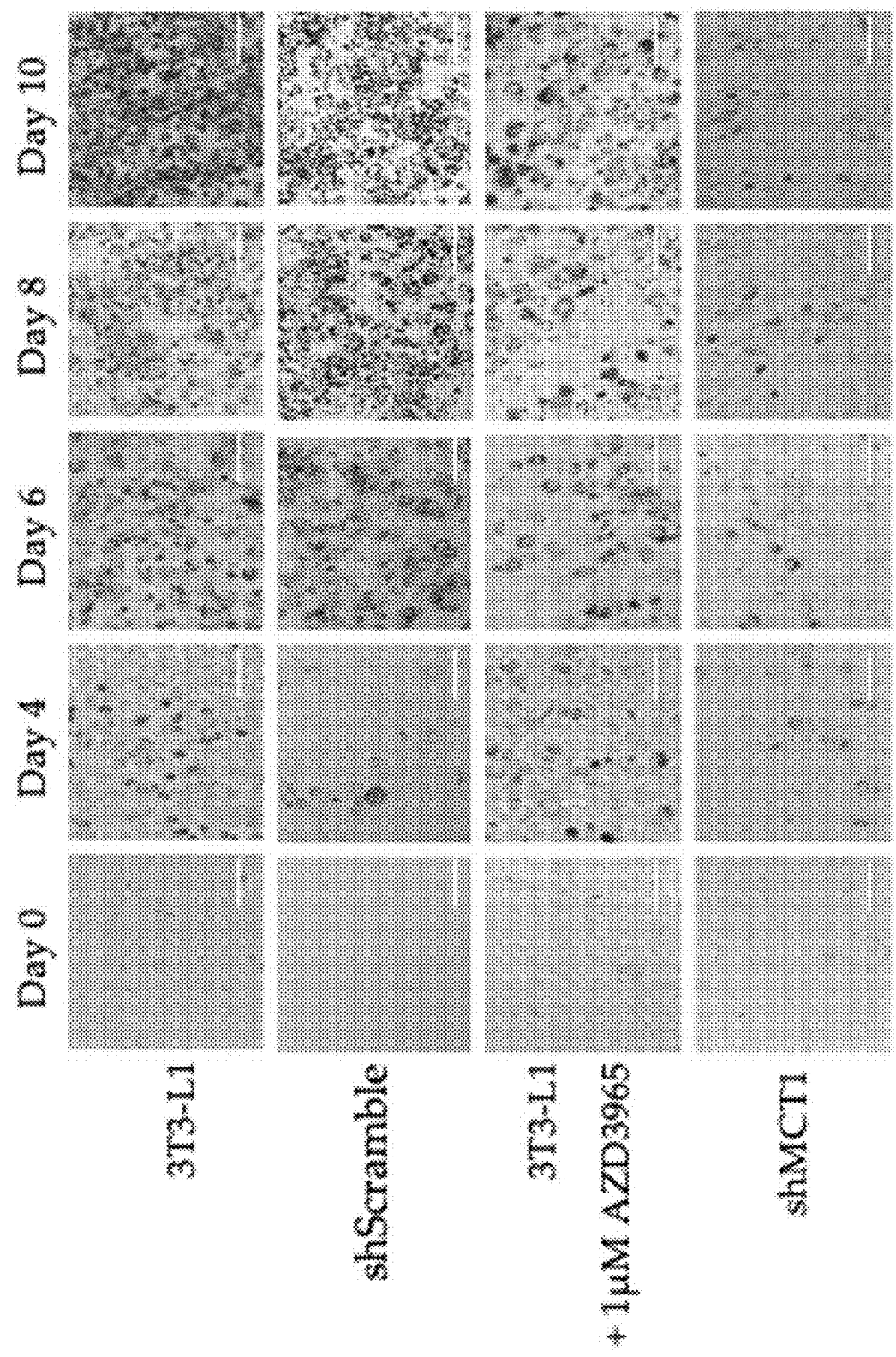

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biology, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Definitions

The term "subject" refers to any individual who is the target of administration or treatment. The subject can be a vertebrate, for example, a mammal. Thus, the subject can be a human or veterinary patient. The term "patient" refers to a subject under the treatment of a clinician, e.g., physician.

The term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio.

The term "alkyl" as used herein throughout the specification, examples, and claims refers to a hydrocarbon group, and includes branched chain variations, or "branched alkyl" groups.

The term "cycloalkyl" as used herein throughout the specification, examples, and claims refers to a cyclic hydrocarbon group, and may include alkyl substituents on the cyclic hydrocarbon group.

The term "substituted alkyl" as used herein refers to alkyl moieties having substituents replacing a hydrogen atom on one or more carbon atoms of the hydrocarbon backbone.

Such substituents can include, for example, a halogen, a halogenated alkyl (e.g., CF3), a hydroxyl, a carbonyl, an amino, an amido, an amidine, an imine, an alkoxy, a halogenated alkoxy (e.g., OCF3, OCHF2, etc.) a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic group. It will be understood by those skilled in the art that the moieties substituted on the hydrocarbon chain can themselves be substituted, if appropriate.

The term "aryl" and "heteroaryl" as used herein includes 5-, 6- and 7-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine, and the like. Those aryl groups having heteroatoms in the ring structure may also be referred to as "aryl heterocycles" or "heteroaromatics." The aromatic ring can be substituted at one or more ring positions with such substituents as described above, for example, halogen, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings can be cycloalkyls, cycloalkenyls, cycloalkynyls, aryls and/or heterocyclyls. The terms ortho, meta and para apply to 1,2-, 1,3- and 1,4-disubstituted benzenes, respectively. For example, the names "1,2-dimethylbenzene" and "ortho, meta-dimethylbenzene" are synonymous.

The term "aralkyl" as used herein refers to an alkyl group substituted with an aryl group (e.g., an aromatic or heteroaromatic group). Examples include CH2Ph, CH2CH2Ph, CH2CH2- indole, and the like. The aromatic ring can be substituted at one or more ring positions with such substituents, as described above.

Unless the number of carbons is otherwise specified, "lower alkyl!" as used herein means an alkyl group, as defined above, but having from one to ten carbons, more preferably from one to six carbon atoms in its backbone structure. Likewise, "lower alkenyl" and "lower alkynyl" have similar chain lengths.

The terms "heterocyclyl" or "heterocyclic group" as used herein refer to 3- to 10-membered ring structures, more preferably 3- to 7-membered rings that include one to four heteroatoms. Heterocycles can also be polycycles. Heterocyclyl groups include, for example, azetidine, azepine, thiophene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring can be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN, or the like.

The terms "polycyclyl" or "polycyclic group" refer to two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms are termed "bridged" rings. Each of the rings of the polycycle can be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN, or the like.

The term "carbocycle", as used herein, refers to an aromatic or non-aromatic ring in which each atom of the ring is carbon.

As used herein, the term "halogen" designates —F, —Cl, —Br or —I.

As used herein, the term "hydroxyl" means —OH.

As used herein, the term "sulfonyl" means —SO2-. The terms "amine" and "amino" as used herein are recognized in the art and refer to both unsubstituted and substituted amines, e.g., a moiety that can be represented by the general formulas —NH2, —NHR, —NRR", where R and R' are alkyl, cycloalkyl, aryl, or heterocyclyl groups, as example.

The terms "alkoxyl" or "alkoxy" as used herein refers to an alkyl group, as defined above, having an oxygen radical attached thereto. Representative alkoxyl groups include methoxy, ethoxy, propyloxy, tert-butoxy and the like.

The term "ether" as used herein refers to two hydrocarbons groups covalently linked by an oxygen atom.

The term "sulfonamido" is art recognized and includes a moiety that can be represented by the general formula —SO2-N(R)(R') wherein where R, and R' are alkyl, cycloalkyl, aryl, or heterocyclyl groups, as examples.

The term "sulfonyl", as used herein, refers to a moiety that can be represented by the general formula —SO2R wherein where R is an alkyl, cycloalkyl, aryl, or heterocyclyl group, as examples.

As used herein, the definition of each expression, e.g., alkyl, m, n, etc., when it occurs more than once in any structure, is intended to be independent of its definition elsewhere in the same structure.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. The phrase "protecting group" as used herein means temporary substituents which protect a potentially reactive functional group from undesired chemical transformations. Examples of such protecting groups include carbamates of amines, esters of carboxylic acids, silyl ethers of alcohols, and acetals and ketals of aldehydes and ketones, respectively. The field of protecting group chemistry has been reviewed (Greene, T. W.; Wuts, P. G. M. Protective Groups in Organic Synthesis, 2nd ed.; Wiley: New York, 1991).

As used herein, the term "effective amount" or "pharmaceutically effective amount" or "therapeutically effective amount" of a composition, is a quantity sufficient to achieve a desired therapeutic and/or prophylactic effect, e.g., an amount which results in the prevention of, or a decrease in, the symptoms associated with insulin resistance. The amount of a composition of the invention administered to the subject will depend on the type and severity of the disease and on the characteristics of the individual, such as general health, age, sex, body weight and tolerance to drugs. It will also depend on the degree, severity and type of disease. The skilled artisan will be able to determine appropriate dosages depending on these and other factors. The compositions of the present invention can also be administered in combination with one or more additional therapeutic compounds. In the methods of the present invention, the MCT1 inhibitors may be administered to a subject having one or more signs of insulin resistance caused by a disease or condition. Administration of an effective amount of the MCT1 inhibitor may improve at least one sign or symptom of insulin resistance in the subject, e.g., body weight, fasting glucose/insulin/free fatty acid, glucose tolerance (OGTT), inflammation, impaired wound healing, in vitro muscle insulin sensitivity, markers of insulin signaling (e.g., Akt-P, IRS-P), mitochondrial function (e.g., respiration or $H_2O_2$ emission), markers of intracellular oxidative stress (e.g., lipid peroxidation, GSH/GSSG ratio or aconitase activity) and mitochondrial enzyme activity.

As used herein, the terms "treating" or "treatment" or "alleviation" refers to both therapeutic treatment and prophylactic or preventative measures, wherein the object is to prevent or slow down (lessen) the targeted pathologic condition or disorder. A subject is successfully "treated" for insulin resistance if, after receiving a therapeutic amount of the MCT1 inhibitor according to the disclosed methods, the subject shows observable and/or measurable reduction in or absence of one or more signs and symptoms of a particular disease or condition. For example, for insulin resistance, treatment may include a reduction in the fasting blood glucose or insulin levels, or the areas under the curve for glucose and insulin in response to oral glucose challenge. It is also to be appreciated that the various modes of treatment or prevention of medical conditions as described are intended to mean "substantial", which includes total but also less than total treatment or prevention, and wherein some biologically or medically relevant result is achieved.

MCT1 Inhibitors

Disclosed herein is a method for promoting insulin sensitivity in a subject that involves administering to the subject a therapeutically effective amount of a composition comprising a monocarboxylate transporter 1 (MCT1) inhibitor.

The major chemical classes of MCT1 inhibitors include Cyanoacetic Acid Derivates, Coumarin Derivatives, Flavone Derivates, Indole Cyanoacrylic Acids, Uracil Derivatives, Pyrazole Derivatives, and Chromenone Derivatives.

In some embodiments, the MCT1 inhibitor is a compound of formula (1):

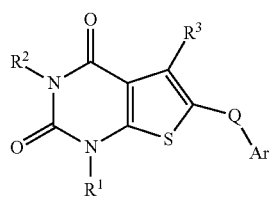

(1)

(as disclosed in PCT Published Patent Application WO2004065394, which is incorporated by reference in its entirety for the teaching of these MCT1 inhibitors) wherein:

$R^1$ and $R^2$ each independently represent a $C_{1-6}$alkyl, $C_{3-6}$alkenyl, $C_{3-5}$cycloalkyl$C_{1-6}$alkyl or $C_{3-6}$Cycloalkyl; each of which may be optionally substituted by 1 to 3 halogen atoms; $R^3$ is a group CO-G or $SO_2$-G where G is a 5- or 6-membered ring containing a nitrogen atom and a second heteroatom selected from oxygen and sulphur adjacent to the nitrogen; the ring being substituted by at least one group selected from halogen or $C_{1-4}$ alkyl, (which may be optionally substituted by up to five halogen atoms), and optionally substituted by up to a further 4 groups independently selected from halogen, hydroxyl and $C_{1-4}$ alkyl, (which may be optionally substituted by up to five halogen atoms);

Q is $CR^4R^5$ where $R^4$ is hydrogen, fluorine or $C_{1-6}$ alkyl and $R^5$ is hydrogen, fluorine or hydroxy; Ar is a 5- to 10-membered aromatic ring system wherein up to 4 ring atoms may be heteroatoms independently selected from nitrogen, oxygen and sulphur, the ring system being optionally substituted by one or more substituents independently selected from $C_{1-4}$alkyl (optionally substituted by 1, 2 or 3 hydroxy groups), $C_{1-4}$alkoxy, halogen, haloalkyl, dihaloalkyl, trihaloalkyl, $C_{1-4}$alkoxy$C_{1-4}$alkyl, $C_{1-4}$alkylthio, $C_{1-4}$alkoxycarbonyl, $C_{2-4}$alkanoyl, oxo, thioxo, nitro, cyano, $-N(R^6)R^7$ and $-(CH_2)pN(R^8)R^9$, hydroxy, $C_{1-4}$alkylsulphonyl, $C_{1-4}$alkylsulphinyl, carbamoyl, $C_{1-4}$alkylcarbamoyl, di-($C_{1-4}$alkyl) carbamoyl, carboxy, $SO_2N(R^6)R^7$, additionally Ar may be optionally substituted by a 5 or 6 membered aromatic ring containing up to 4 heteroatoms independently selected from nitrogen, oxygen and sulphur, and which is optionally substituted by one or more substituents independently selected from $C_{1-4}$alkyl (optionally substituted by 1,2 or 3 hydroxy groups), $C_{1-4}$alkoxy, halogen, haloalkyl, dihaloalkyl, trihaloalkyl, $C_{1-4}$alkoxy$C_{1-4}$alkyl, $C_{1-4}$alkylthio, $C_{1-4}$alkoxycarbonyl, $C_{2-4}$alkanoyl, oxo, thioxo, nitro, cyano, $-N(R^6)R^7$ and $-(CH_2)pN(R^8)R^9$, hydroxy, $C_{1-4}$alkylsulphonyl, $C_{1-4}$alkylsulphinyl, carbamoyl, $C_{1-4}$alkylcarbamoyl, di-($C_{1-4}$alkyl) carbamoyl, carboxy, $SO_2 N(R^6)R^7$, p is 1, 2, 3 or 4;

$R^6$ and $R^7$ each independently represent a hydrogen atom, $C_{1-4}$alkanoyl or $C_{1-4}$alkyl, or together with the nitrogen atom to which they are attached form a 5- to 7-membered saturated heterocyclic ring; and $R^8$ and $R^9$ each independently represent a hydrogen atom, $C_{1-4}$alkanoyl or $C_{1-4}$alkyl, or together with the nitrogen atom to which they are attached form a 5- to 7-membered saturated heterocyclic ring; and pharmaceutically acceptable salts thereof.

In some embodiments, the MCT1 inhibitor is a compound of formula (A), (B), or (C):

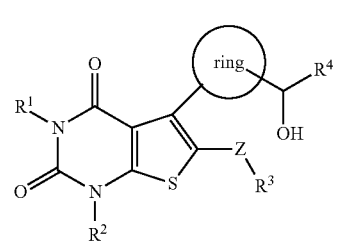

A

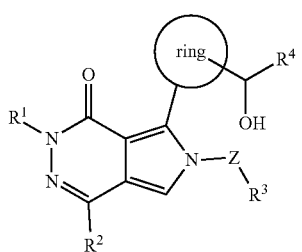

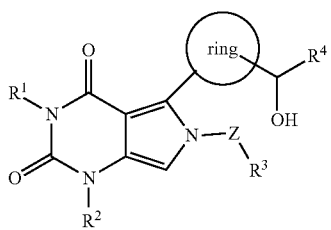

(as disclosed in PCT Published Patent Application WO2016118825, which is incorporated by reference in its entirety for the teaching of these MCT1 inhibitors), wherein R$^1$ is selected from the group consisting of hydrogen, (C$_1$-C$_6$)alkyl, (C$_3$-C$_6$) branched alkyl, (C$_3$-C$_7$) cycloalkyl, and (C C$_6$) fluoroalkyl;

R$^2$ is selected from the group consisting of hydrogen, (CrC$_6$)alkyl, (C$_3$-C$_6$) branched alkyl, (C$_3$-C$_7$) cycloalkyl, (C C$_6$) fluoroalkyl, a (C$_6$-C$_{10}$) aryl ring system, a 5- to 9-membered heteroaryl ring system, a (C C$_6$)alkyl-(C$_6$-C$_{10}$) aryl ring system, and a (C$_1$-C$_6$)alkyl-(5- to 9-membered) heteroaryl ring system;

provided that when R$^2$ comprises an aryl or heteroaryl ring system, the ring system bears 0-2 independently selected substituents from the group consisting of fluoro, chloro, trifluoromethyl, (C$_1$-C$_6$)alkoxy, and (CrC$_6$) fluoroalkoxy;

R$^3$ is a monocyclic or bicyclic (C$_6$-C$_{10}$) aryl or a monocyclic or bicyclic (5- to 10-membered) heteroaryl group, wherein the aryl or heteroaryl can be substituted or unsubstituted;

R$^4$ is hydrogen, (C C$_6$)alkyl, (C$_3$-C$_6$) branched alkyl, (C$_3$-C$_7$) cycloalkyl, (C$_6$-C$_{10}$) aryl, (5- to 7-membered) heteroaryl, or (4- to 7-membered) saturated heterocyclyl with 1-2 instances of heteroatoms selected from the group consisting of NH, NMe, O, and S;

for structure A, Z is CH$_2$, CH((C C$_6$)alkyl), CH((C$_3$-C$_7$) cycloalkyl), O, N, S, S(O), or SO$_2$;

for structures B and C, Z is CH$_2$, CH((C C$_6$)alkyl), CH((C$_3$-C$_7$) cycloalkyl), or O;

n=1, 2, or 3;

the cyclic group indicated as "ring" is an aryl or heteroaryl group of any one of the following:

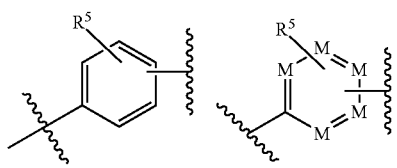

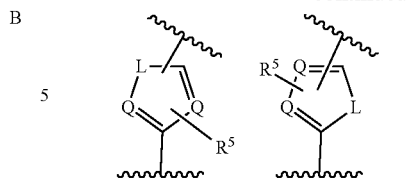

wherein wavy lines indicate points of bonding, and wherein M is independently selected CH or N, provided that M group can be a nitrogen atom in 0, 1, or 2, instances;

L is S, O, NH, N(CrC$_6$)alkyl, or NCF3;

each Q is independently CH or N;

wherein R$^5$ is optionally present, when present, R$^5$ is one to four instances of independently selected F, C$_1$, Br, CF3, (CrC$_6$)alkyl, OCF3, 0 (C C$_6$)alkyl, or CO—(C C$_6$)alkyl; or, the cyclic group indicated as "ring" is a (C$_3$-C$_7$) cycloalkyl or a saturated (3- to 7-membered) heterocyclyl comprising 1-2 heteroatoms selected from the group consisting of O, NH, N(C$_1$-C$_6$)alkyl, and N(C$_1$-C$_6$) fluoroalkyl; wherein the points of bonding may be cis or trans; wherein R$^5$ is optionally present, when present, R$^5$ is one to four instances of independently selected F, C$_1$, Br, CF3, (C C$_6$)alkyl, OCF3, 0 (CrC$_6$) alkyl, or CO—(C C$_6$)alkyl;

or a pharmaceutically acceptable salt thereof.

In some embodiments, the MCT inhibitor is AZD3965 (CAS Number: 1448671-31-5) (5-[[(4S)-4-hydroxy-4-methyl-2-isoxazolidinyl]carbonyl]-3-methyl-1-(1-methylethyl)-6-[[5-methyl-3-(trifluoromethyl)-1H-pyrazol-4-yl]methyl]-thieno[2,3-d]pyrimidine-2,4 (1H, 3H)-dione), having the formula:

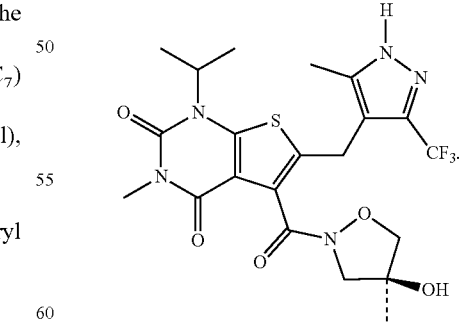

In some embodiments, the MCT inhibitor is AR-C155858 (CAS Number: 496791-37-8) (6-[(3,5-dimethyl-1H-pyrazol-4-yl)methyl]-5-[[(4S)-4-hydroxy-2-isoxazolidinyl]carbonyl]-3-methyl-1-(2-methylpropyl) thieno[2,3-day]pyrimidine2,4 (1H,3H)-dione), having the formula:

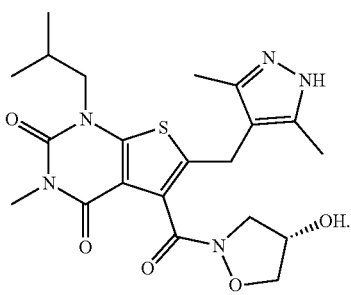 [SMILES: Cc1n[nH]c(C)c1Cc1sc2c(c1C(=O)N1C[C@H](O)CO1)c(=O)n(C)c(=O)n2CC(C)C]

In some embodiments, the MCT inhibitor is α-cyano-4-hydroxycinnamic (α-CCA) (CAS Number: 28166-41-8), having the formula:

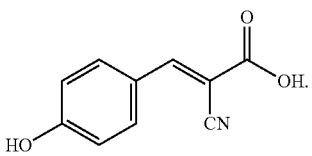

In some embodiments, the MCT inhibitor is FACH or [F18]FACH, having the formula:

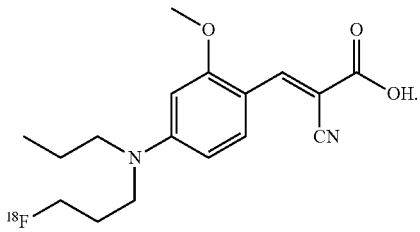 [SMILES: CCCN(CCC[18F])c1ccc(/C=C(\C#N)C(=O)O)c(OC)c1]

In some embodiments, the MCT inhibitor is compound A, having the formula:

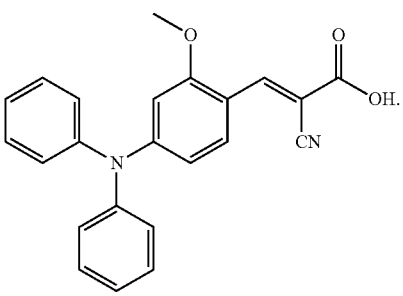 [SMILES: COc1cc(N(c2ccccc2)c2ccccc2)ccc1/C=C(\C#N)C(=O)O]

Treating Insulin Resistance

Disclosed herein are methods of treating a subject at risk of (or susceptible to) a disorder or having a disorder associated with insulin resistance. Insulin resistance is generally associated with prediabetes, type II diabetes, coronary artery disease, malglycemia, hyperinsulinemia, renal dysfunction, atherosclerosis, obesity, hyperlipidemia, hyperuricemia, low grade chronic inflammation, endothelial dysfunction, essential hypertension, cardiovascular disease, heart attack, stroke, prothrombotic state, non-alcoholic fatty liver disease (NAFLD) which can progress to non-alcoholic steatohepatitis (NASH) liver fibrosis, and cirrhosis. Insulin resistance is also associated with rare insulin resistance syndromes Type A and Type B, agromegaly, polycystic ovarian syndrome, Parkinson's Disease, and Alzheimer's disease. Cumulatively, insulin resistance syndromes, including, but not limited to diabetes, underlie many of the major causes of morbidity and death of people over age 40. Accordingly, the disclosed methods for the prevention and/or treatment of insulin resistance and associated syndromes in a subject can involve administering an effective amount of an MCT1 inhibitor to a subject in need thereof. For example, a subject can be administered an MCT1 inhibitor in an effort to improve the sensitivity of mammalian adipose tissues to insulin. In one embodiment, the MCT1 inhibitors are useful to prevent drug-induced obesity, insulin resistance, and/or diabetes, when the MCT1 inhibitor is administered with a drug that shows a side-effect of causing one or more of these conditions (e.g., olanzapine, Zyprexa®).

Subjects at risk for a disease that is caused or contributed to by aberrant mitochondrial function or insulin resistance can be identified by, e.g., any or a combination of diagnostic or prognostic assays as described herein. In prophylactic applications, pharmaceutical compositions or medicaments of MCT1 inhibitors are administered to a subject susceptible to, or otherwise at risk of a disease or condition in an amount sufficient to eliminate or reduce the risk, lessen the severity, or delay the outset of the disease, including biochemical, histologic and/or behavioral symptoms of the disease, its complications and intermediate pathological phenotypes presenting during development of the disease. Administration of a prophylactic MCT1 inhibitor can occur prior to the manifestation of symptoms characteristic of the aberrancy, such that a disease or disorder is prevented or, alternatively, delayed in its progression.

Also disclosed are methods of modulating insulin resistance or sensitivity in a subject for therapeutic purposes. In therapeutic applications, compositions or medicaments are administered to a subject suspected of, or already suffering from such a disease in an amount sufficient to cure, or at least partially arrest, the symptoms of the disease (biochemical, histologic and/or behavioral), including its complications and intermediate pathological phenotypes in development of the disease. An amount adequate to accomplish therapeutic or prophylactic treatment is defined as a therapeutically- or prophylactically-effective dose. These modulatory methods can be performed in vitro (e.g., by culturing the cell with the MCT1 inhibitor) or, alternatively, in vivo (e.g., by administering the MCT1 inhibitor to a subject). As such, the invention provides methods of treating an individual afflicted with an insulin resistance-associated disease or disorder.

MCT1 inhibitors are currently being explored for use in treating cancers. Therefore, in some embodiments, the subject of the disclosed methods has not been diagnosed with a cancer. In some embodiments, the dosage of the MCT1 inhibitor used in the disclosed methods is insufficient for treating cancer. For example, the MCT1 inhibitor AZD3965 is in some embodiments effective for treating cancer when given at a dosage of about 10 mg twice a day. Therefore, in some embodiments, AZD3965 can be effective in the disclosed methods at a dosage less than 10 mg per day, such as 0.1, 0.2, 0.3, 0.4, 0.5, 0.6, 0.7, 0.8, 0.9, 1.0, 2.0, 3.0, 4.0, or 5.0 mg per day. In some embodiments, the MCT1 inhibitor is given at a dosage that is at least 50% less than the lowest effective dose for treating cancer.

A number of embodiments of the invention have been described. Nevertheless, it will be understood that various modifications may be made without departing from the spirit and scope of the invention. Accordingly, other embodiments are within the scope of the following claims.

EXAMPLES

Example 1: Inhibition of the Monocarboxylate Transporter 1 (MCT1) Promotes 3T3-L1 Adipocyte Proliferation and Enhances Insulin Sensitivity Introduction Over the last four decades there has been a dramatic increase in the prevalence of obesity with recent reports (2017-2018) indicating that >73% of the adult US population is overweight with a body mass index (BMI)>25 kg/m$^2$, and 42.5% designated as obese (BMI>30 kg/m$^2$). Concomitant with the trends in obesity is the marked increase in the prevalence of Type 2 Diabetes Mellitus (T2DM) where greater than 85% of T2DM patients are also obese (Apovian, C M, et al. Adv. Ther. 2019 36:44-58). T2DM is a complex metabolic disorder characterized by hyperglycemia arising from a combination of impaired insulin secretion, increased hepatic glucose production, and decreased insulin-mediated glucose uptake (insulin resistance) (Kahn, S E, et al. Lancet 2014 383:1068-1083). In addition to the epidemiological evidence establishing obesity as the leading risk factor for T2DM (Barnes, A S, et al. Texas Hear. Inst. J. 2011 38:142-144), the molecular mechanisms through which obesity contributes to the development of insulin resistance in insulin-responsive tissues (i.e., skeletal muscle, adipose tissue, and the liver) can be largely credited to the inability of mature white adipocytes to perpetually expand to accommodate excess energy in the form of triglycerides. To compensate, 'lipid overflow' into ectopic sites (i.e., liver, kidney, skeletal muscle and pancreas) occurs at the expense of inducing lipotoxicity and insulin resistance (Gustafson, B, et al. Trends Endocrinol. Metab. 2015 26:193-200).

After reaching lipid saturation, adipocytes can undergo hypertrophy (increase in ad-ipocyte size) or hyperplasia (increase in number of adipocytes) to accommodate for increased triglyceride storage needs (Ghaben, A L, et al. Nat. Rev. Mol. cell Biol. 2019 20:242-258). Although a subset of obese individuals referred to as metabolically 'healthy' obese maintain adipose tissue expandability through hyperplasia, adipose tissue expansion in the majority of obese individuals occurs primarily through hypertrophy (Iacobini, C, et al. Metabolism 2019 92:51-60). In this context, enlarged adipocytes have a profound impact on the metabolic health of adipose tissue and in regulating insulin sensitivity (Kim, S M, et al. Cell Metab. 2014 20:1049-1058), glucose uptake and inflammation (Haczeyni, F, et al. Obes. Rev. 2018 19:406-420). It has long been appreciated that increased adipocyte size correlates to systemic insulin resistance (Salans, L B, et al. J. Clin. Invest. 1968 47:153-165) while smaller adipocytes retain insulin sensitivity. As adipocyte hypertrophy contributes to many of the adverse metabolic events associated with obesity, inducing hyperplasia or cell division in hypertrophic adipocytes has the potential to redistribute lipid content and improve the overall metabolic health of obese individuals. Hence, it has recently been suggested that inducing hyperplasia to improve the metabolic 'health' of adipocytes may be an alternative therapeutic strategy to weight loss to treat insulin-resistance and related metabolic disease (Salans, L B, et al. J. Clin. Invest. 1968 47:153-165).

Under normal physiological conditions, adipocyte hyperplasia occurs in response to the secretion of paracrine growth factors leading to an increase in the number of preadipocytes within the adipose tissue depot, and their subsequent differentiation into mature adipocytes. This process is dependent on the tight regulation of several cell cycle related events including the growth arrest of proliferating preadipocytes, the coordinated re-entry into the cell cycle through mitotic clonal expansion, and finally, terminal differentiation (Salans, L B, et al. J. Clin. Invest. 1968 47:153-165). However, it has been proposed that mature adipocytes also contribute to hyperplasia either through de-differentiation (Suwa, A, et al. FEBS J. 2011 278:565-569), subsequent proliferation and re-differentiation (Salans, L B, et al. J. Clin. Invest. 1968 47:153-165), or re-entry of mature adipocytes into the cell cycle (Okamatsu-Ogura, Y, et al. Sci. Rep. 2017 7:1-12; Kajita, K, et al. Endocr. J. 2013 EJ13-0141; Sugihara, H, et al. J. Lipid Res. 1987 28:1038-1045). Thus, proteins or signaling pathways that regulate adipocyte growth arrest and cell cycle could promote hyperplasia and have the potential to serve as therapeutic targets for the treatment of various metabolic disorders.

As disclosed herein, one such protein is the monocarboxylate transporter 1 (MCT1); one of 14 members of the SLC 16a solute carrier gene family encoding monocarboxylate transporters (MCTs). Within this subfamily, MCT1, MCT2, MCT3 and MCT4 have been identified as proton-linked, bidirectional transporters responsible for the influx and efflux of monocarboxylates such as lactate, pyruvate, ketone bodies and certain drugs across the plasma membrane (Halestrap, A P. IUBMB Life 2012 64:1-9). In addition to regulating lactate trafficking, MCT1 is a well-established target of c-Myc, an oncogenic transcription factor that drives continuous cell growth and division (Doherty, J R, et al. Cancer Res 2014 74:908-920), and is highly upregulated in proliferating cells (DeBerardinis, R J, et al. Cell Metab. 2008 7:11-20). Interestingly, MCT1 expression has also been reported to increase over the course of adipocyte differentiation owing to increased lactate flux as preadipocytes mature into adipocytes (Petersen, C, et al. Sci. Rep. 2017 7:13101). Adipocytes are highly glycolytic even under conditions of excess oxygenation and contribute significantly to circulating lactate levels, particularly in obese individuals (Jansson, P A, et al. J. Clin. Invest. 1994 93:240-246). Furthermore, serum lactate levels have been shown to directly correlate with insulin resistance in obese and non-obese individuals (Jansson, P A, et al. J. Clin. Invest. 1994 93:240-246). While enhanced lactate metabolism and MCT1 expression is associated with adipocyte differentiation, proliferation and systemic insulin resistance, the relationship between these processes and the influence of modulating MCT1-mediated lactate flux in adipocytes is unknown.

By regulating intracellular lactate concentration, MCT1 also plays an important role in regulating redox homeostasis (Brooks, G A. Redox Biol. 2020 35:101454; Carrière, A, et al. J. Physiol. Biochem. 2020 76:241-250). In adipocytes, lactate abundance and MCT1 function have been shown to impact redox signaling mechanisms with widespread biological consequences. This is primarily accredited to the function of lactate as an electron donor, enabling the reduction of NAD+ to NADH through its lactate dehydrogenase catalyzed oxidation to pyruvate (Rabinowitz, J D, et al. Nat. Metab. 2020 2:566-571). While it is known that redox signaling is critical to cell cycle progression and growth arrest (Chiu, J, et al. Trends Cell Biol. 2012 22:592-601), it has been recently reported that MCT1 mediated lactate transport induces plasticity and mitochondrial biogenesis as a mechanism to alleviate redox pressure in mature adipocytes (Carrière, A, et al. Diabetes 2014 63:3253-3265).

In this study, using the classical white adipocyte cell model, murine 3T3-L1 cells, it is demonstrated that treatment with a small molecule inhibitor of MCT1 (AZD3965) results in the re-entry of mature adipocytes into the cell cycle. The adipogenic profile of differentiated 3T3-L1 cells treated with an MCT1 inhibitor is altered at mRNA, protein, and phenotypic levels wherein these cells exhibit distinct transcript and protein expression signatures, as well as, a decrease in lipid content and enhanced insulin sensitivity. Thus, inhibiting MCT1 activity in mature adipocytes may serve as a novel mechanism to induce re-entry of fully differentiated adipocytes into the cell cycle with the potential to promote adipocyte proliferation and hyperplasia.

Results

Inhibition of MCT1 in 3T3-L1 Cells Hinders Adipocyte Lipid Accumulation

Murine embryonic fibroblast (MEF) cells, namely 3T3-L1, were cultured and differentiated into mature lipid-laden adipocytes according to well established protocols (Zebisch, K, et al. Anal. Biochem. 2012 425:88-90). In agreement with previous reports, MCT1 expression in 3T3-L1 cells was confirmed at both mRNA and protein levels (FIGS. 1A, and 1B, 1C, respectively). To enable the study of genetically inhibiting MCT1 expression, 3T3-L1 cells transduced with short hairpin RNA directed against MCT1 (shMCT1) or a scrambled RNA (shScramble) were used to generate stable 3T3-L1 cell lines depleted of MCT1, and a shRNA 3T3-L1 control cell line (3T3-L1-shMCT1 and 3T3-L1-shScramble, respectively). Successful knockdown of MCT1 expression at both mRNA and protein levels in 3T3-L1-shMCT1 was demonstrated with reverse transcription quantitative polymerase chain reaction (RT-qPCR) and immunoblotting (FIGS. 1A, and 1B,1C, respectively).

Figure 1E:
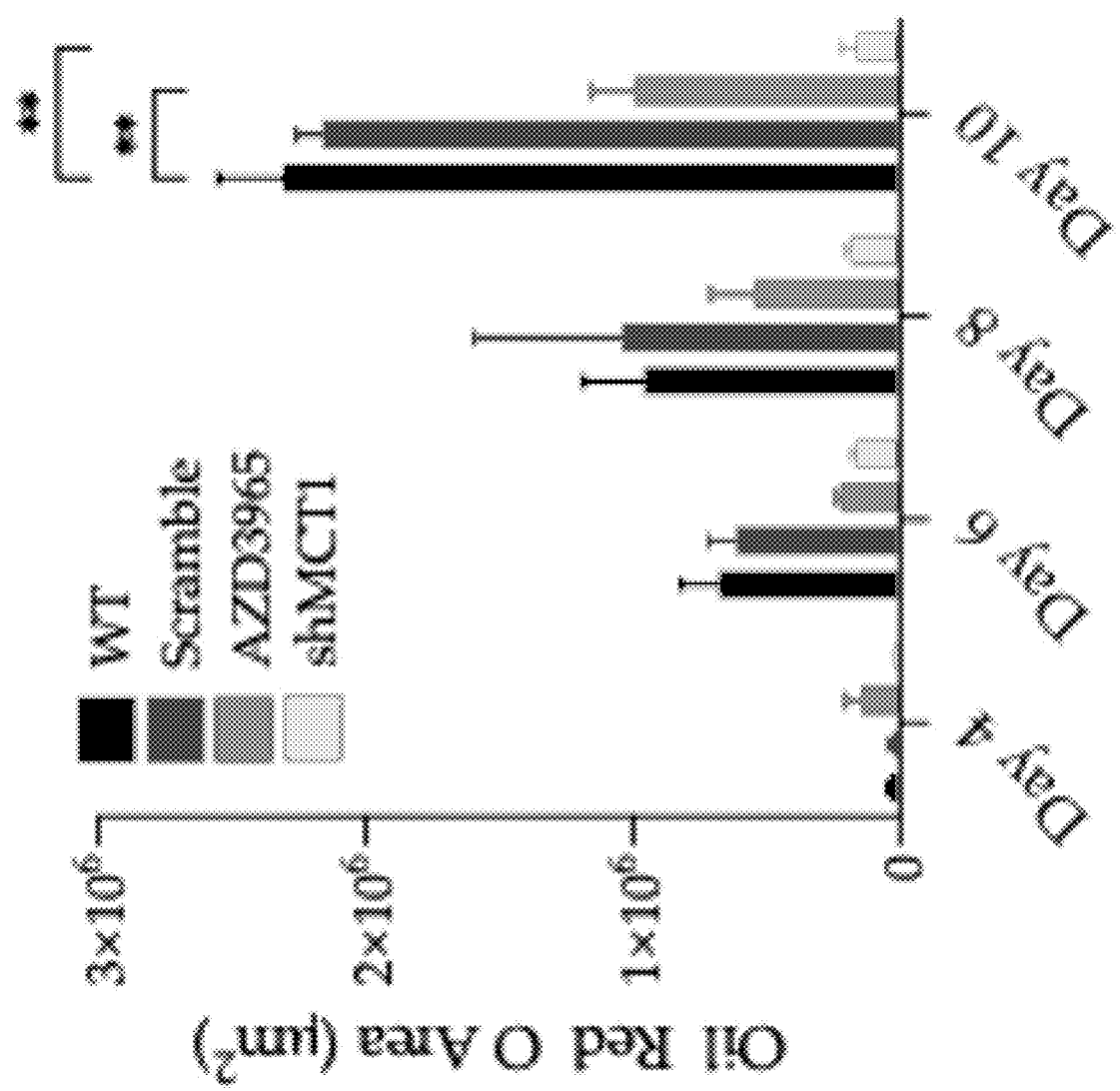

To determine the effect of pharmacological inhibition of MCT1 on adipocyte differentiation, 3T3-L1 cells were differentiated with or without 1 µM AZD3965, the previously described potent and selective, small molecule MCT1 inhibitor (Curtis, N J, et al. Oncotarget 2017 8:69219-69236). As expected, by day 6 of the differentiation process both control 3T3-L1 and shScramble cells began forming lipid droplets as measured by Oil Red O staining (FIG. 1D, 1E). Conversely, 3T3-L1 cells that were differentiated in the presence of 1 µM AZD3965 and 3T3-L1-shMCT1 cells contained significantly less lipid over the course of differentiation (FIG. 1D; third and fourth panels respectively). The quantification of Oil Red O area (i.e. lipid content) is presented in FIG. 1E.

Figure 1F:
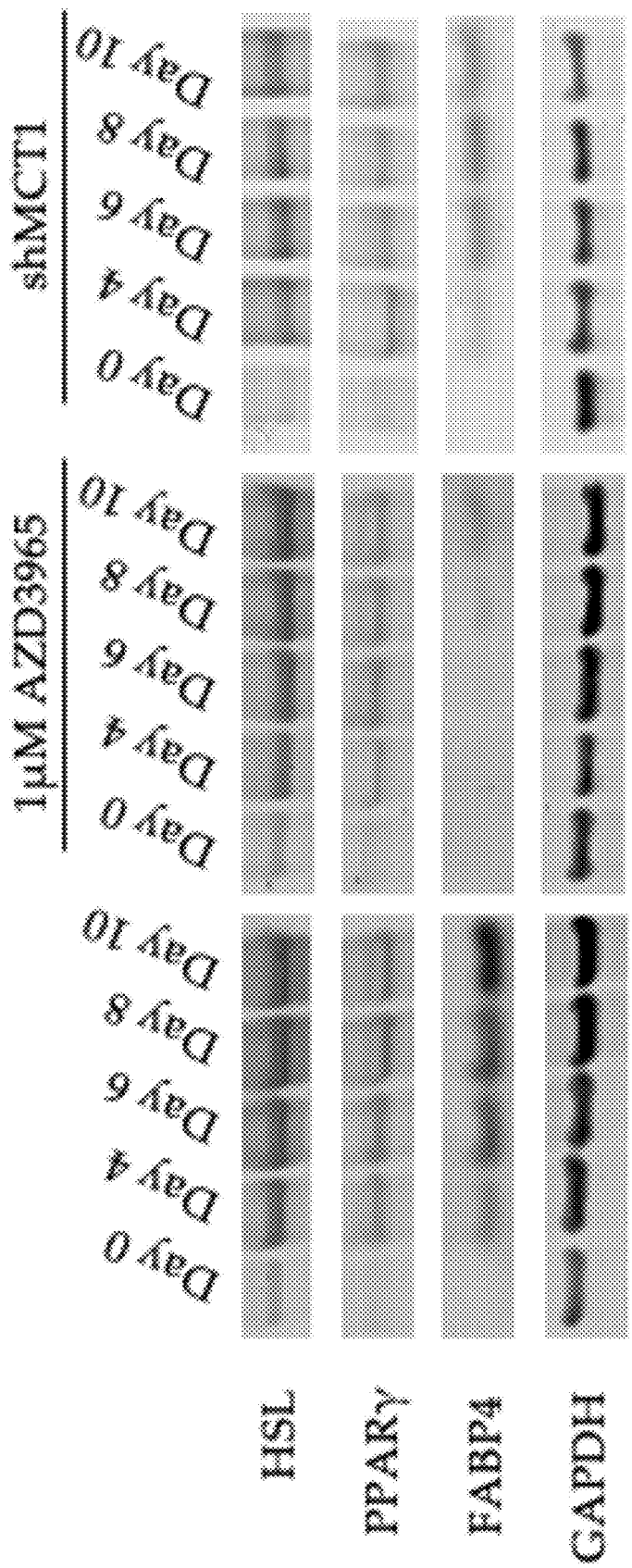
Figure 1G:
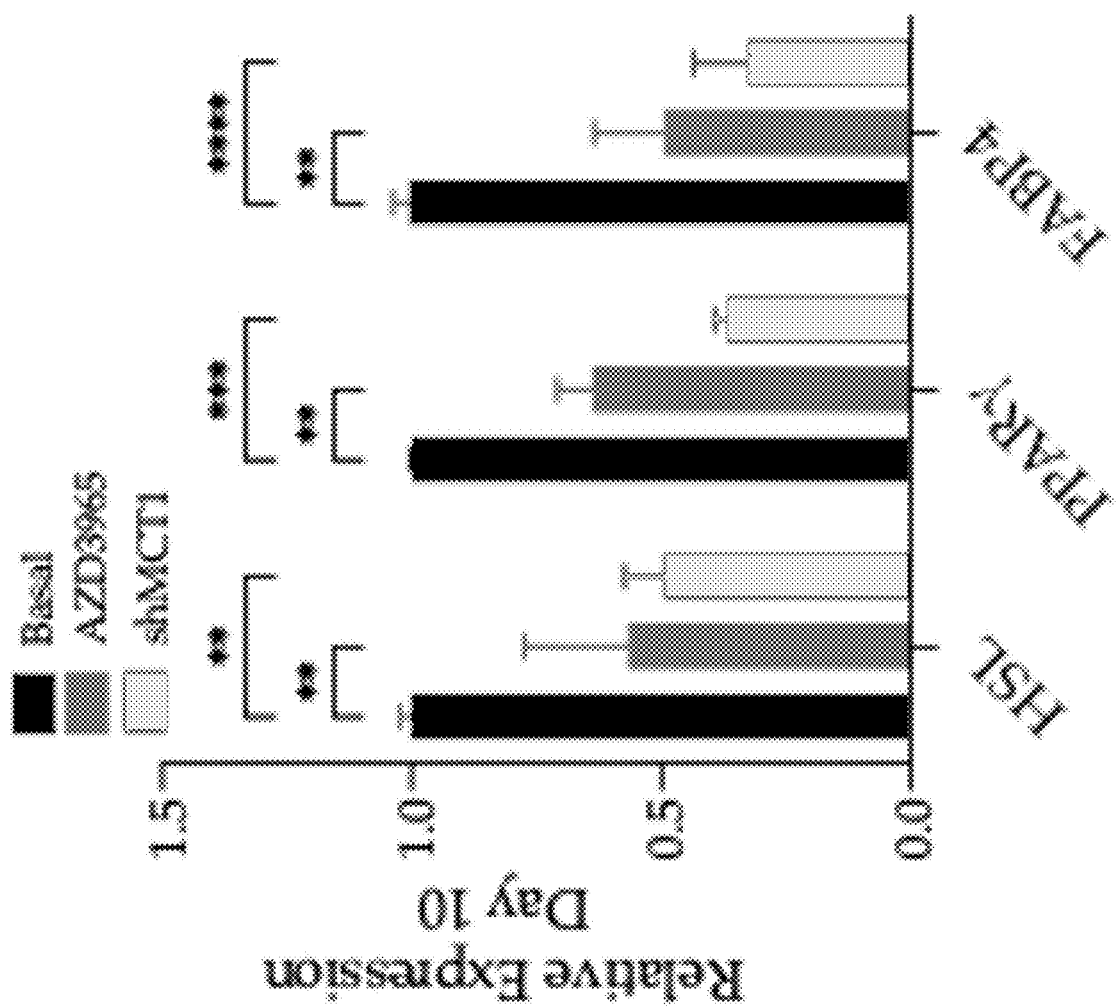

MCT1 Inhibition Suppresses Induction of the Adipogenic Gene Expression in Preadipocytes Shortly after exposure to differentiation media (containing insulin, dexamethasone and 3-isobutyl-1-methylxanthine (IBMX)) the adipogenic gene expression program is induced upregulating various transcription factors and adipose-specific genes. Thus, protein expression of the transcription factor peroxisome proliferator-activated receptor γ (PPARγ), considered to be the master regulator of adipogenesis, and the PPARγ regulated adipocyte markers, Fatty Acid-Binding Protein 4 (FABP4/aP2) (Tontonoz, P, et al. Annu. Rev. Biochem. 2008 77:289-312), and Hormone Sensitive Lipase (HSL) (Deng, T, et al. Endocrinology 2006 147:875-884), were analyzed. As expected, expression of these adipocyte related proteins increased as differentiation progressed in untreated 3T3-L1 cells and in 3T3-L1-sh-scramble cells. However, in 3T3-L1 cells differentiated in the presence of AZD3965, and shMCT1 containing 3T3-L1 cells, the expression levels of PPARγ, HSL and FABP4 were significantly attenuated (FIGS. 1F,1G).

Mature Adipocytes Show Reduced Lipid Content, but Remain Differentiated after MCT1 Inhibition Similar experiments to those carried out in differentiating preadipocytes were performed to assess the impact of MCT1 inhibition on fully differentiated, 'mature' adipocytes. Differentiated adipocytes show a progressive decrease in lipid content following 1 µM AZD3965 treatment (FIGS. 2A, 2B; microscopy and quantification respectively). A viability assay performed on these cells demonstrated that the reduction in lipid content was not due to AZD3965-induced cytotoxicity (FIG. 2C). After cell death was eliminated as a potential explanation for the observed depletion in adipocyte lipid content, changes in lipid metabolism were examined. As nicotinamide adenine dinucleotide phosphates (NADP+/NADPH) are critical cofactors for lipid biosynthesis, changes in the bioavailability of NADP+ and NADPH were monitored. A subtle, yet significant decrease in the concentration of this cofactor species was observed following 24 hr, 48 hr and 72 hr of MCT1 inhibition (FIG. 1E) suggesting that AZD3965 treated cells are unable to support the high rates of lipogenesis characteristic of adipocytes. The influence of MCT1 inhibition on rates of lipolysis, the primary mechanism of triglyceride catabolism into glycerol and free fatty acids in adipocytes, was also probed. AZD3965 treatment significantly increased intracellular glycerol levels at all time points measured (FIG. 2E) indicating that MCT1 inhibition results in a significant increase in cellular lipolysis.

Figures 6A, 6B:
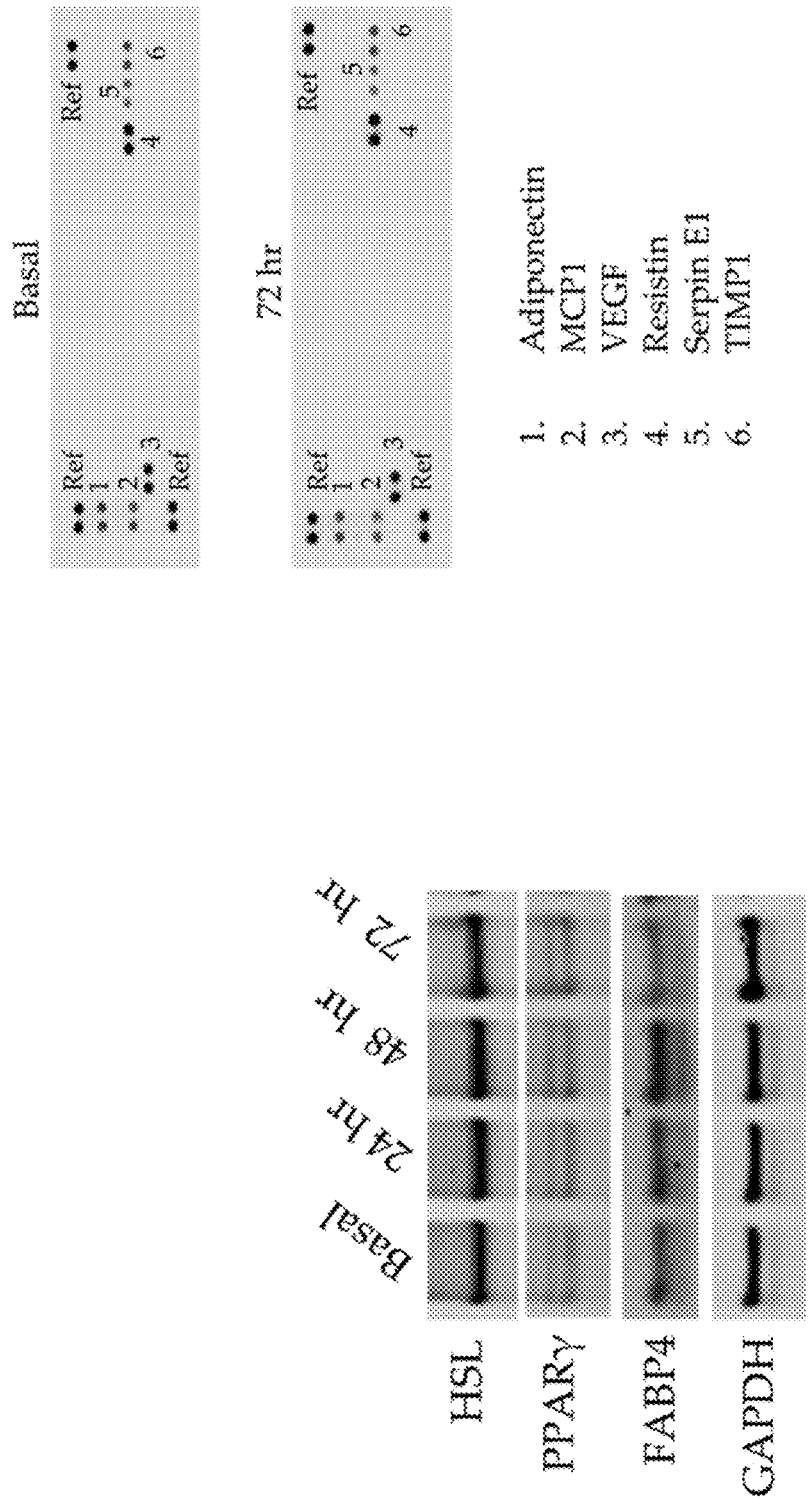
FIG. 6A. Image of immunoblot quantified in FIG. 2G.
FIG. 6B. Images of adipokine antibody arrays quantified in FIG. 2H.

In addition to assessing changes in lipid content and metabolism in MCT1 inhibitor treated cells, transcript and protein expression levels of the aforementioned adipogenic proteins, PPARγ, FABP4, and HSL, were also assessed following inhibitor treatment (FIGS. 2F, 2G, and 6A) to determine if these adipocytes remain differentiated following AZD3965 treatment. Although RT-qPCR demonstrated a significant decrease in PPARγ transcript levels in mature adipocytes following 24 hr of treatment with AZD3965 (FIG. 2F), no changes in PPARγ protein expression were observed following up to 72 hr of AZD3965 treatment (FIG. 2G). On the other hand, changes in transcript levels of FABP4 did correlate with corresponding changes in protein expression. Specifically, FABP4 mRNA levels were significantly increased following 24 hr of MCT1 inhibition (FIG. 2F) and this was reflected at the protein level for up to 48 hr of compound treatment; however, by 72 hr this increase was attenuated (FIG. 2G). Conversely, MCT1 inhibition resulted in a significant decrease in HSL expression following 24-72 hr of compound treatment (FIG. 2G). In addition to monitoring changes in the expression of these adipogenic proteins, changes in adipokine secretion following treatment with AZD3965 were also assessed utilizing an adipokine antibody microarray. Conditioned media collected from adipocytes that had been treated with or without AZD3965 for 72 hr showed no significant differences in adipokine levels (FIGS. 2H and 6B) supporting the premise that adipocytes remain differentiated following MCT1 inhibition.

RNA Sequencing Reveals Transcriptional Consequences of MCT1 Inhibition in Adipocytes Because the major role of MCT1 is the transport of lactate, pyruvate, and other mono-carboxylates across the plasma membrane, intracellular lactate concentration was measured at discrete time points ranging from 15 min to 24 hr of 1 μM AZD3965 treatment. Within 15 minutes of treatment, a significant increase in intracellular lactate was observed (FIG. 3A) and was maintained through the first 4 hr of AZD3965 treatment. With export inhibited, lactate can be disposed of through its oxidation back into pyruvate or its direct, complete oxidation in the mitochondria. To examine these potential fates of lactate, changes in intracellular pyruvate and the intracellular NAD+/NADH ratio, often used as a proxy for cellular pyruvate/lactate (Rabinowitz, J D, et al. Nat. Metab. 2020 2:566-571), were monitored over the same time course. It was observed that MCT1 inhibition resulted in a significant increase in intracellular pyruvate following the first 8 hr of treatment (FIG. 2B), and a significant change in the ratio of NAD+/NADH across all time points measured (FIG. 3C). Specifically, a significant decrease in the NAD+/NADH ratio was observed for the first 8 hr of AZD3965 treatment indicating an increase in lactate relative to pyruvate. These results suggest that AZD3965 treatment leads to a significant increase in both intracellular lactate and pyruvate and a relative increase in lactate compared with pyruvate.

After 24 hr of AZD3965 treatment, intracellular lactate levels were diminished to values approximately 2 fold above basal and intracellular pyruvate levels were not significantly altered (FIGS. 3A,3B), suggesting that differentiated 3T3-L1 cells adapt within this time-period to manage high intracellular lactate levels and a change in the NAD+/NADH ratio resulting from MCT1 inhibition. These findings along with the previously observed significant decrease in intracellular lipid content were suggestive of transcriptional changes taking place within 24 hr. To interrogate the consequences of MCT1 inhibition in mature adipocytes, a transcriptomics analysis was conducted using RNA sequencing (RNA-seq) followed by a comprehensive pathway analysis on adipocytes treated with or without 1 μM AZD3965 for 24 hr.

Figures 3A, 3B, 3C:
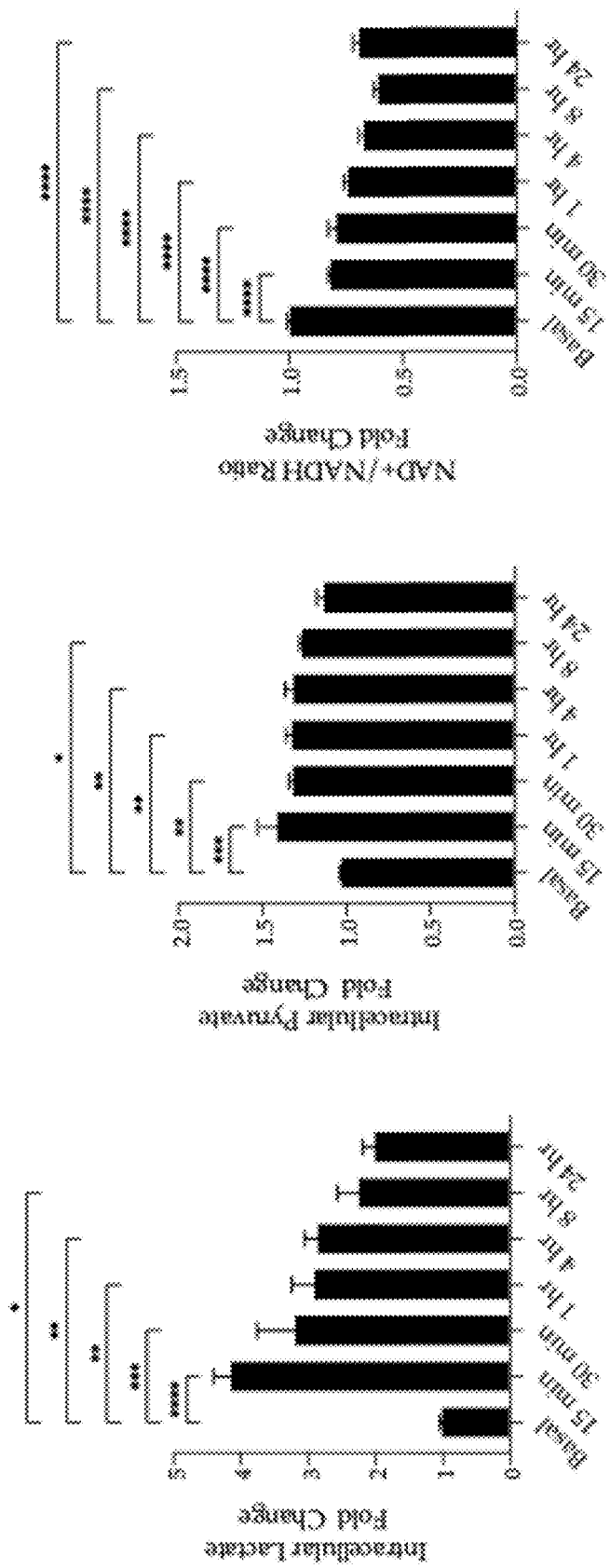
FIGS. 3A to 3E. Phenotypic and transcriptomic analysis of adipocytes following MCT1 inhibition.
Figures 3D, 3E:
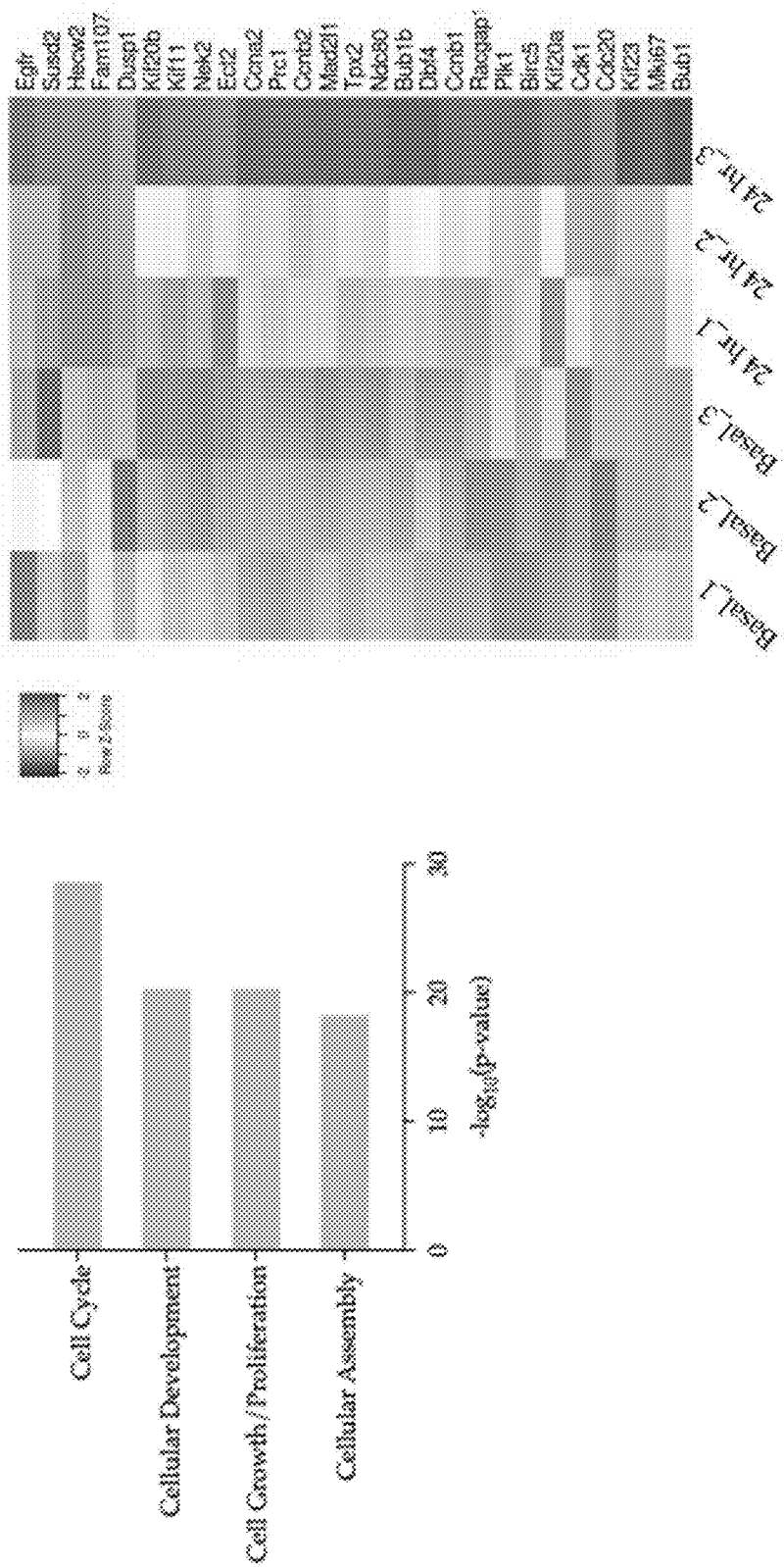

Results from the RNA-seq experiment indicated that 277 genes were significantly ($p<0.05$) differentially expressed following MCT1 inhibition. Pathway analysis conducted using Ingenuity Pathway Analysis (IPA) revealed that these differentially expressed genes, including the cyclin dependent kinase 1 (CDK1) (Ding, L, et al. Int. J. Mol. Sci. 2020 21:1960), polo-like kinase (PLK1) (Ma, X, et al. Nat. Commun. 2017 8:1-15), and DNA topoisomerase 2-α (TO2A) (Mjelle, R, et al. DNA Repair (Amst). 2015 30:53-67) among others, are largely implicated in the regulation of cell cycle and mitosis (FIG. 3D). Genes involved in the progression of cell cycle show a significant upregulation in treated adipocytes, while genes that inhibit cell cycle progression (e.g., DUSP1) (Liu, Y X, et al. Mol. Cancer Res. 2008 6:624-633) were significantly decreased (FIG. 3E). Furthermore, molecular functions predicted to be significantly altered included cellular development, cell growth and proliferation, as well as cellular assembly and organization (FIG. 3D). Pathway analysis also predicted the activation of cytokinesis (the cytoplasmic division of a cell at the end of mitosis or meiosis, bringing about the separation into two daughter cells (Alberts, B, et al. Cytokinesis. In Molecular Biology of the Cell. 4th edition; Garland Science, 2002)). Taken together, a transcriptional fingerprint characterized by the upregulation of mRNAs related to cell cycle and proliferation suggested potential for adipocytes to re-enter the cell cycle.

Adipocytes Re-Enter Cell Cycle Following MCT1 Inhibition

To validate the results from RNA-seq, RT-qPCR was performed, and it was confirmed that MCT1 inhibitor treatment induced significant upregulation of genes known to promote cell cycle progression including CDK1, PLK1, TOP2A and Cyclin B (FIG. 4A). Of these genes, CDK1 activity is known to be largely regulated by post-translational modifications with differential influences on the progression of the cell cycle depending on certain phosphorylation and dephosphorylation events (Obaya, A J, et al. Cell. Mol. Life Sci. C. 2002 59:126-142). Therefore, CDK1 was probed for changes in protein expression and phosphorylation. While there was no change in total CDK1 protein expression following treatment with an MCT1 inhibitor for up to 72 hr, a significant decrease in CDK1 phosphorylation at Tyr15 was observed (FIG. 4B,C). Phosphorylation of Tyr15 maintains CDK1 in an inactive state (Norbury, C, et al. EMBO J. 1991 10:3321-3329). Thus, the decrease in Tyr15 phosphorylation following AZD3965 treatment indicates an increase in the active form of CDK1, known to promote mitosis (Nigg, EA. Nat. Rev. Mol. cell Biol. 2001 2:21-32), supporting the hypothesis that MCT1 inhibition may promote adipocyte cell cycle progression and proliferation (i.e., hyperplasia).

Figure 4E:
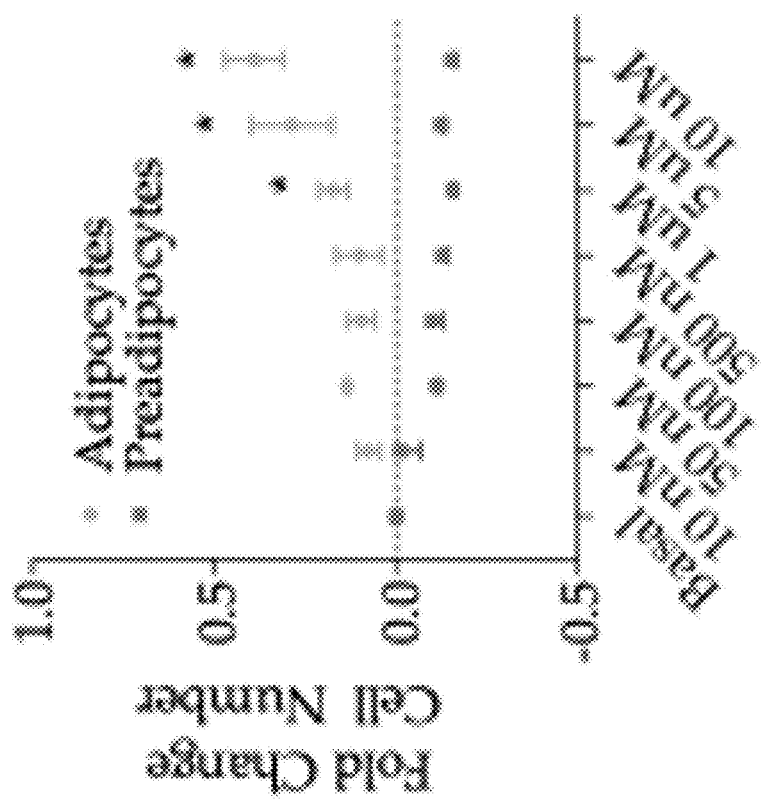
Figure 4D:
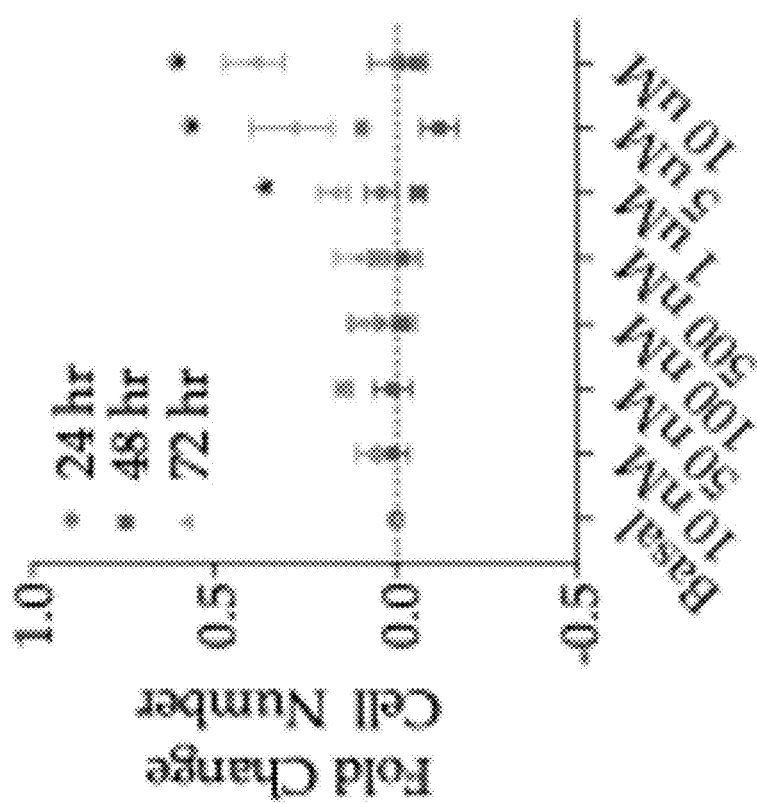

To assess changes in adipocyte proliferation, a fluorescent DNA dye-based assay was used to determine if a change in cell number occurred following MCT1 inhibition. After 72 hr treatment, a significant increase in total cell number was observed for all concentrations of AZD3965 treatment ≥1 μM (FIG. 4D). To assess if the observed phenotype was specific to differentiated adipocytes or could be attributed to preadipocytes present in cell culture even after rigorous differentiation, proliferation assays were also performed on preadipocytes. As shown in FIG. 4E, compound treatment had no effect on proliferation in preadipocytes, confirming that the proliferation phenomenon is unique to mature adipocytes.

Figures 4F, 4G:
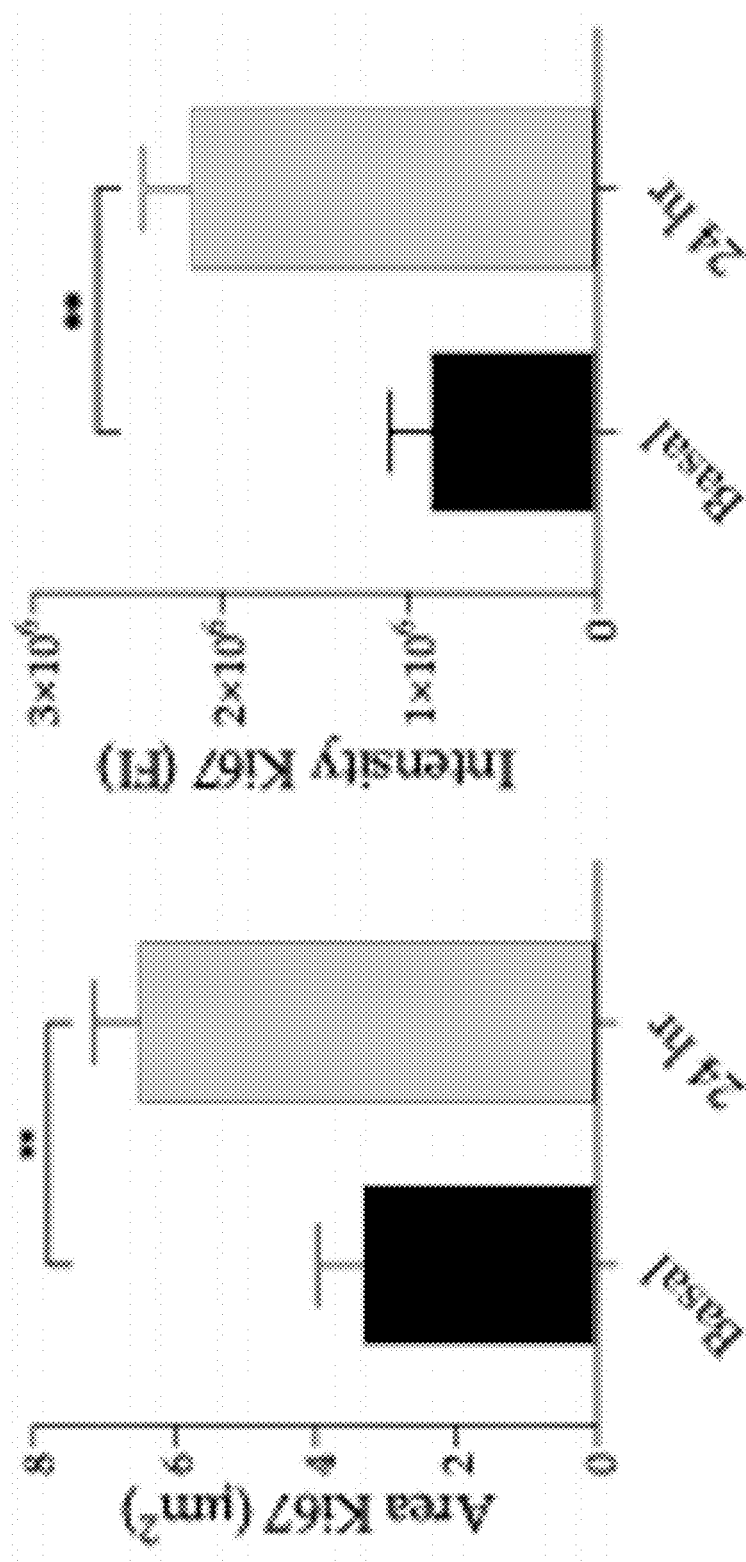
Figure 4H:
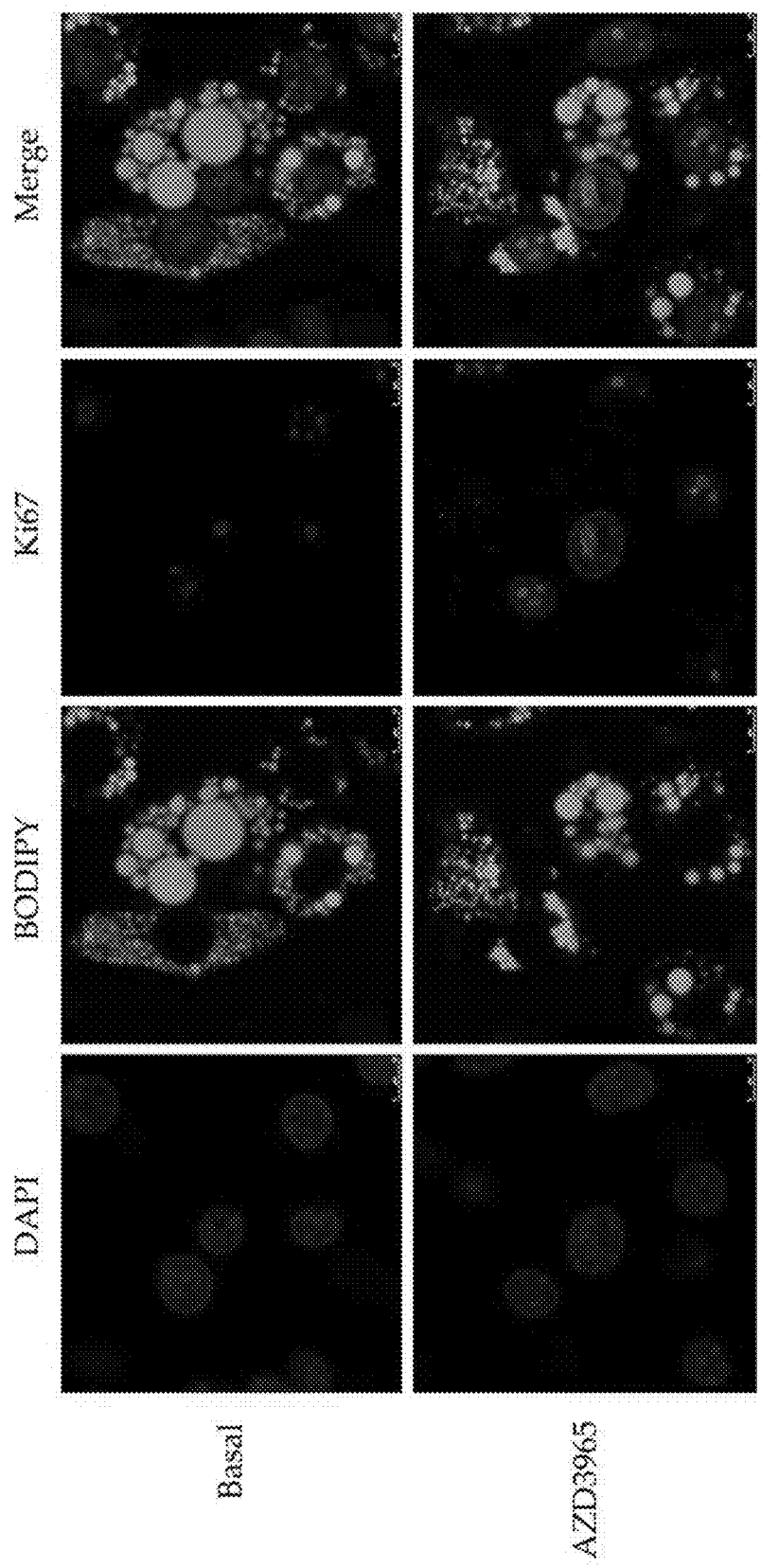

Further studies using confocal microscopy were conducted to capture the proliferation of MCT1 inhibitor treated mature adipocytes. Following 24 hr of 1 μM AZD3965 treatment, a significant increase in the expression of Ki67 (a widely-used marker of proliferation (Sun, X, et al. Chromosoma 2018 127:175-186)) was observed when compared to untreated adipocytes. As seen in FIG. 4H, Ki67 expression was enhanced in AZD3965 treated adipocytes as visualized by co-staining with BODIPY (a lipophilic green-fluorescent dye used to stain lipid droplets, convenient for double fluorescence labeling in adipocytes) supporting the hypothesis that MCT1 inhibition promotes re-entry into the cell cycle and subsequent proliferation of mature adipocytes. Quantification of Ki67 expression was performed by analyzing 1000 nuclei per experimental condition captured by 12 randomized images for area and intensity of Ki67 (i.e., signal in the Cy5 channel) normalized by nuclei number per image (FIGS. 4F,4G).

MCT1 Inhibition Enhances Adipocyte Glucose Uptake in a CDK1 Dependent Manner

Figures 5A, 5B, 5C:
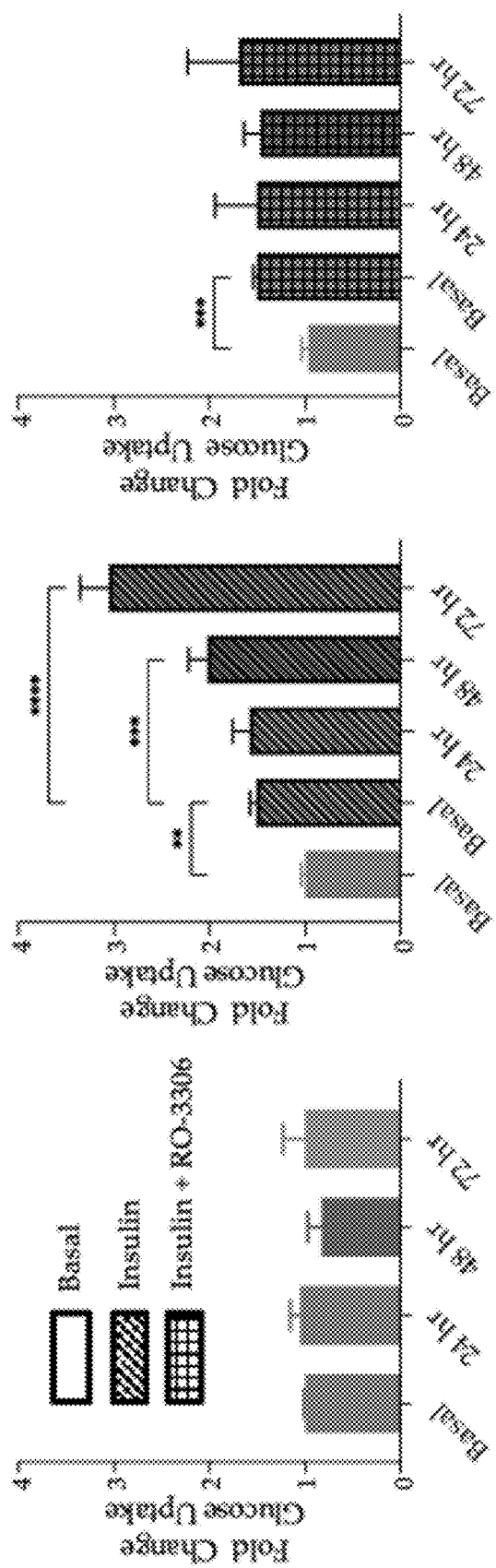
FIGS. 5A to 5G. Insulin responsiveness. Glucose uptake in differentiated 3T3-L1 (WT) cells.

A major metabolic benefit of inducing adipocyte hyperplasia is an increase in insulin-stimulated glucose uptake. In order to evaluate the potential impact of MCT1 inhibition in mature adipocyte insulin sensitivity, alterations in glucose uptake rates were monitored. While 1 μM AZD3965 treatment had no impact on basal, non-insulin stimulated glucose uptake (FIG. 5A), there was a significant increase in insulin-stimulated glucose uptake following 48 hr and 72 hr of MCT1 inhibitor treatment (FIG. 5B). Trends toward an increase in glucose uptake were also observed following 24 hr of AZD3965 treatment; however, this increase did not reach statistical significance. To determine if this effect was related to or distinct from the observed phenotype of cell cycle re-entry, the specific CDK1 inhibitor RO-3306 (Vassilev, L T, et al. Proc. Natl. Acad. Sci. U.S.A 2006 103:10660-10665) was utilized. RO-3306 is known to induce growth arrest through CDK1 inhibition by preventing cells from entering mitosis. Differentiated adipocytes co-treated with RO-3306 (10 UM) and AZD3965 (1 µM) remained insulin responsive; however, the effects of AZD3965 were attenuated (FIG. 5C).

Figures 5D, 5E, 5F:
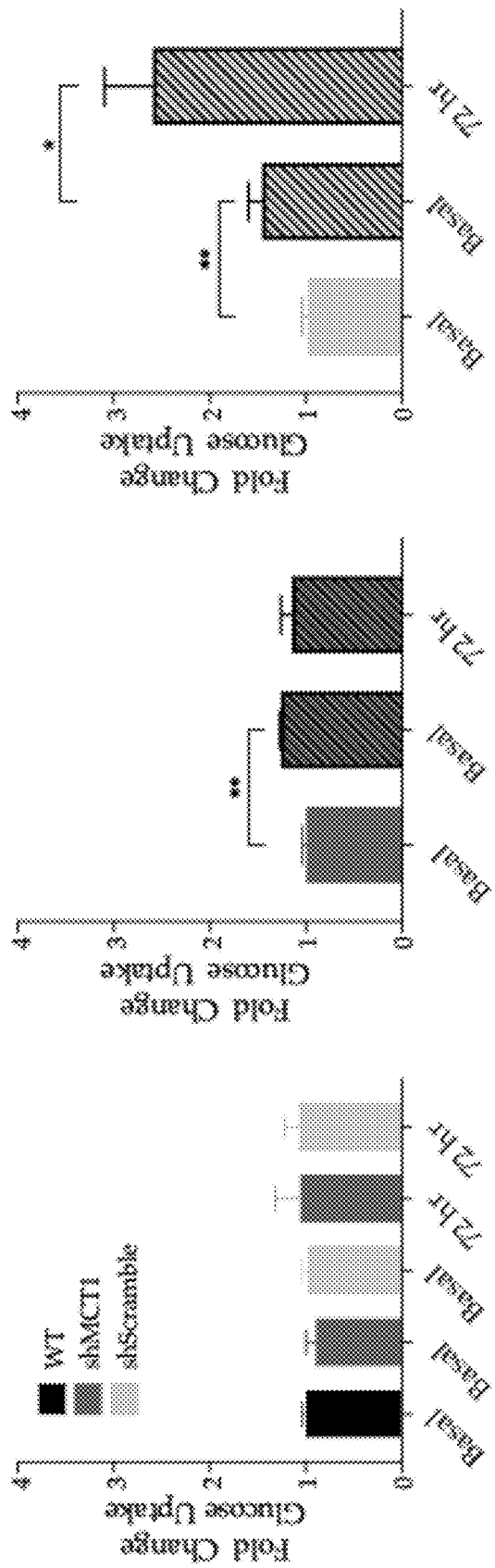

To investigate if insulin handling was modified in adipocytes with decreased MCT1 expression, 3T3-L1-shMCT1 cells were differentiated and subjected to similar glucose up-take experiments. First, it was established that there were no significant differences in basal glucose uptake levels between wild type (WT), shMCT1 and shScramble cells (FIG. 5D). When stimulated with insulin, 3T3-L1-shMCT1 cells showed significantly increased levels of glucose uptake indicating that these cells maintain some insulin sensitivity; however, they do not respond to insulin as robustly as WT 3T3-L1 cells or show any increase in insulin-stimulated glucose uptake following 72 hr treatment with 1 µM AZD3965 (FIG. 5E). To ensure that the somewhat diminished insulin sensitivity of 3T3-L1-shMCT1 cells is a result of MCT1 expression inhibition and not a product of the lentiviral transduction system, 3T3-L1 cells containing shScramble were also characterized. Much like WT cells, shScramble 3T3-L1 cells robustly enhanced glucose uptake following insulin stimulation and this effect was augmented by 72 hr treatment with 1 µM AZD3965 (FIG. 5F).

Figure 5G:
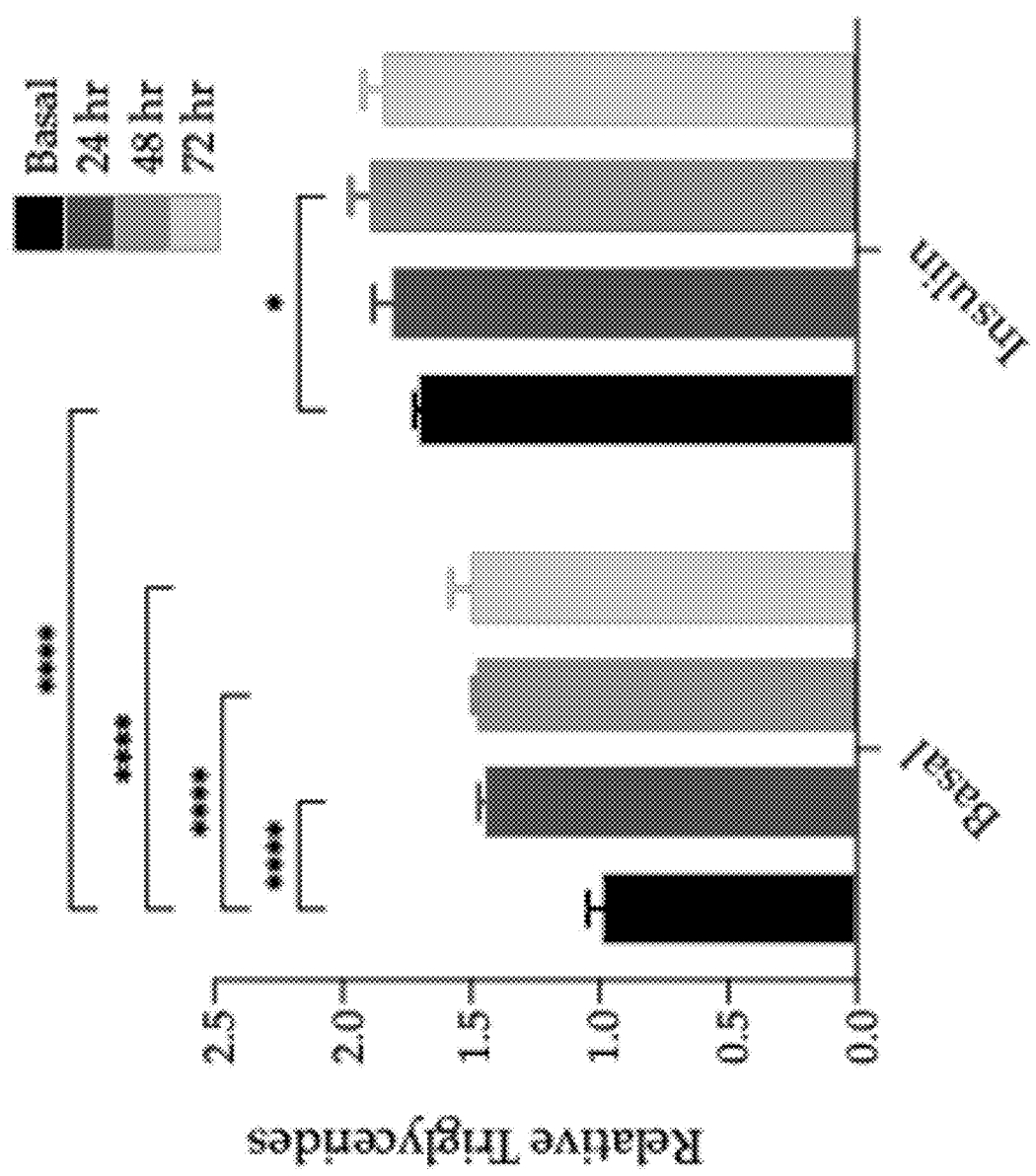

Finally, to test the overarching hypothesis that MCT1 inhibition could induce hyperplasia in differentiated adipocytes, changes in total triglyceride content of adipocytes cultured with or without insulin (100 nM) for 72 hr following pretreatment for up to 72 hr with or without AZD3965 (1 µM) was assessed. Cell culture media is replaced with media lacking AZD3965 prior to measuring triglycerides. In support of the hypothesis, it was demonstrated that cells pretreated with AZD3965 accumulated significantly more triglycerides than adipocytes which had not been exposed to the MCT1 inhibitor when cultured without insulin (FIG. 5G). As expected, all conditions (with or without AZD3965 pre-treatment) showed a significant increase in total triglycerides when cultured with insulin, an agent known to promote lipogenesis. However, adipocytes pretreated with AZD3965 for 48 hours and following removal of AZD3965 prior to insulin stimulation developed significantly more triglycerides than AZD3965 naive cells also cultured with insulin (FIG. 5G). Together these results suggest that AZD3965 treatment can induce hyperplasia and support an increase in lipid storage capacity.

Discussion

Obesity is associated with adipose tissue expansion and ectopic fat deposition. Adipose tissue is a critical regulator of whole-body metabolism and energy homeostasis where its primary function is to store energy in the form of lipids with glucose uptake playing a key role in providing substrates for lipogenesis (Song, Z, et al. Nutrients 2018 10:1383). In the context of positive energy balance, where nutrient intake exceeds energy expenditure, excess energetic substrates stored as triglyceride lipid droplets induce adipose tissue expansion. This expansion can occur by existing adipocytes increasing in size (hypertrophy), or by recruiting adipose progenitor cells for adipogenesis leading to an increase in adipocyte number (hyperplasia). Hence, adipocyte hypertrophy occurs to meet the demands for additional energy storage until the adipocyte reaches a critical size threshold and capacity for lipid storage (Rosen, E D, et al. Cell 2014 156:20-44). Subsequently, adipocyte progenitor cell recruitment and expansion occurs by hyperplasia to accommodate the excess until the readily available adipocyte progenitor cells are depleted. These newly formed adipocytes can also expand until they reach their hypertrophic capacity at which time excess lipids 'spill over' and are deposited at ectopic sites such as the liver, skeletal muscle, kidney, and pancreas (Marra, F, et al. Curr. Pharm. Des. 2013 19:5250-5269).

It has been demonstrated that lean individuals predisposed to hypertrophic adipose tissue expansion have reduced insulin sensitivity (Hammarstedt, A, et al. Diabetol. Metab. Syndr. 2012 4:1-9), and that adipocyte hypertrophy is a common feature seen in non-obese patients with T2DM (Acosta, J R, et al. Diabetologia 2016 59:560-570). In 'metabolically fit' individuals, adipose tissue expands primarily by hyperplasia. Adipose tissue expansion through hyperplasia is associated with improved metabolic health, and as such, therapeutically targeting hyperplasia has been suggested as a potential therapy for metabolic disease (Ghaben, A L, et al. Nat. Rev. Mol. cell Biol. 2019 20:242-258). Moreover, it is well established that insulin sensitivity is directly correlative with adipo-cyte size, wherein, newly formed smaller adipocytes are insulin-sensitive, and hypertrophic adipocytes are often insulin resistant (Hammarstedt, A, et al. Diabetol. Metab. Syndr. 2012 4:1-9; Acosta, J R, et al. Diabetologia 2016 59:560-570).

Another important feature of adipocytes also associated with glucose uptake is the production and release of lactate (Krycer, J R, et al. Biol. Chem. 2020 295:83-98). Lactate production, utilization and signaling has extensive impacts on metabolic health, particularly in adipose tissue depots (Digirolamo, M, et al. FASEB J. 1992 6:2405-2412). Recently, it has been reported that via MCT1, the main lactate transporter in adipocytes, exogenous lactate administration can induce adipose tissue plasticity and adaptive thermogenesis (Carrière, A, et al. J. Physiol. Biochem. 2020 76:241-250; Carrière, A, et al. Diabetes 2014 63:3253-3265). It was demonstrated that these changes were the direct result of lactate induced redox pressure as excess lactate fuels the production of pyruvate and NADH, at the expense of NAD+. As glycolytic production of lactate and its transport via MCTs control the metabolic activity of fat cells, to gain further mechanistic insight into the influence of MCT1 activity on adipocyte biology, the classic adipocyte model cell system, differentiated 3T3-L1 cells, was employed. Using this model, a combination of in vitro and transcriptomic analyses of preadipocytes and mature adipocytes treated with and without the potent and selective MCT1 small molecule inhibitor, AZD3965, was performed. Of note, AZD3965 is currently in clinical trials (NCT01791595) for the treatment of advanced cancers including diffuse large B-cell Lymphoma (DLBCL) and Burkitt Lymphoma (BL). Phase I of this trial was completed in November 2020 and results regarding the safety and tolerability of AZD3965 are anticipated.

Inducing 3T3-L1 differentiation increases triglyceride synthesis, and approximately 4 days after the first exposure to differentiation medium, cells show signs of lipid accumulation. However, when 3T3-L1 cells were differentiated in the presence of a pharmacological inhibitor of MCT1 (AZD3965), cells accumulated significantly less lipid than the untreated adipocytes (FIGS. 1D, 1E); the same observation was made in the shMCT1-harboring cells (FIGS. 1A, 1B, 1C), suggesting that MCT1 inhibition impairs lipid accumulation and differentiation. Exposure to differentiation media also induces transcriptional activation, and up regulation of adipogenic genes such as the transcription factor and nuclear hormone, PPARγ. PPARγ positively regulates expression of multiple genes involved in adipogenesis including FABP4 and HSL (Deng, T, et al. Endocrinology 2006 147:875-884). FABP4 is a cytoplasmic carrier protein for fatty acids, and it has been proposed that FABP4 enables HSL activity in adipocytes by chaperoning lipids liberated by HSL-mediated lipolysis to the plasma membrane (Nielsen, T S, et al. J. Mol. Endocrinol. 2014 52: R199-R222). When expression of these well-known markers of differentiation was assessed, a decrease in the expression levels of PPARγ, FABP4 and HSL was observed in AZD3965 treated and shMCT1 expressing cells corroborating the previous finding reported herein that MCT1 inhibition impairs adipocyte differentiation (FIGS. 1F, 1G).

Figure 2B:
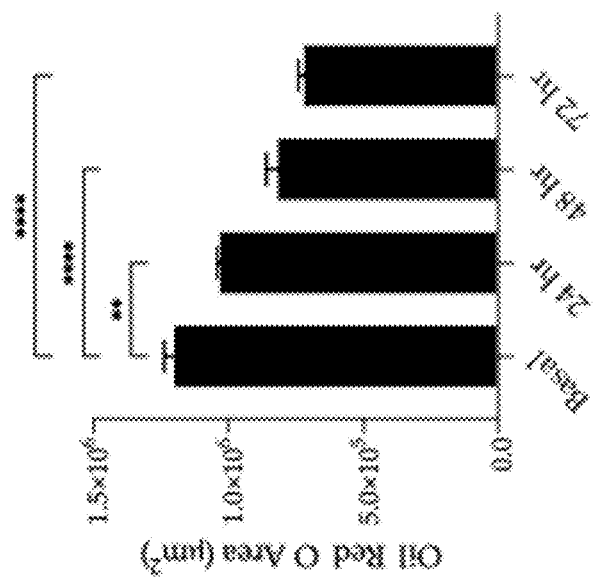
FIGS. 2A to 2H. MCT1 inhibition in fully differentiated adipocytes.
Figure 2A:
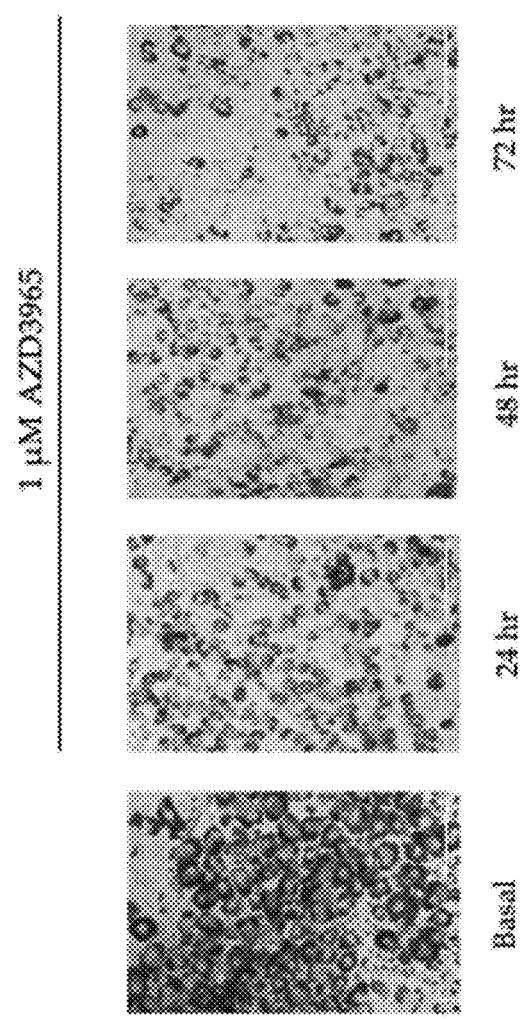
Figure 2C:
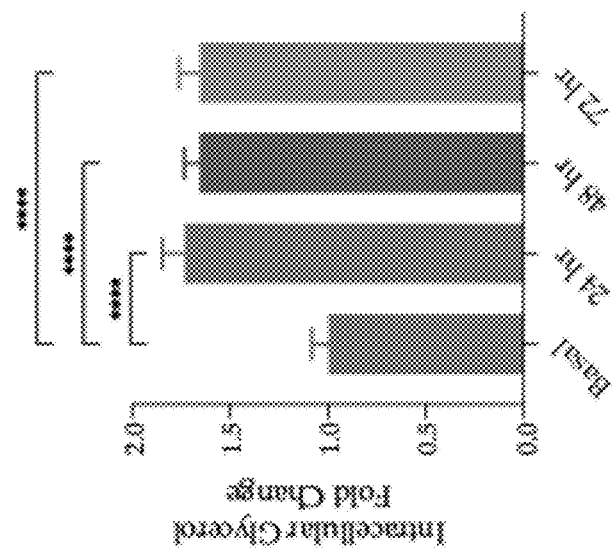
Figure 2D:
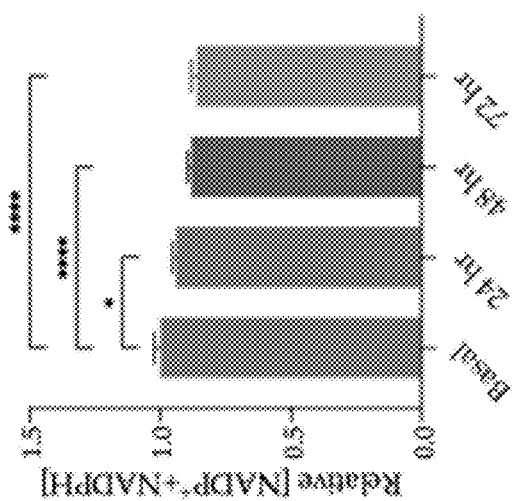
Figure 2E:
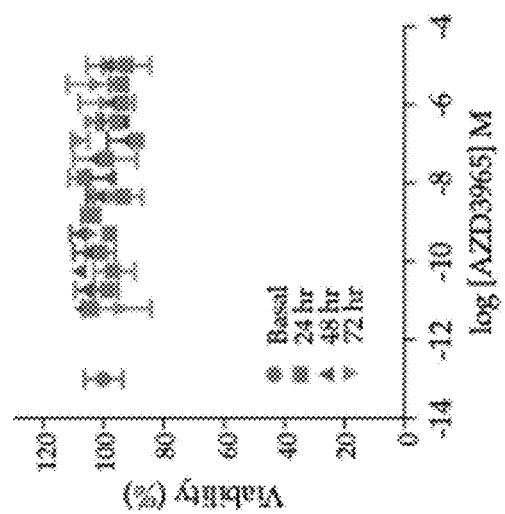
Figure 2H:
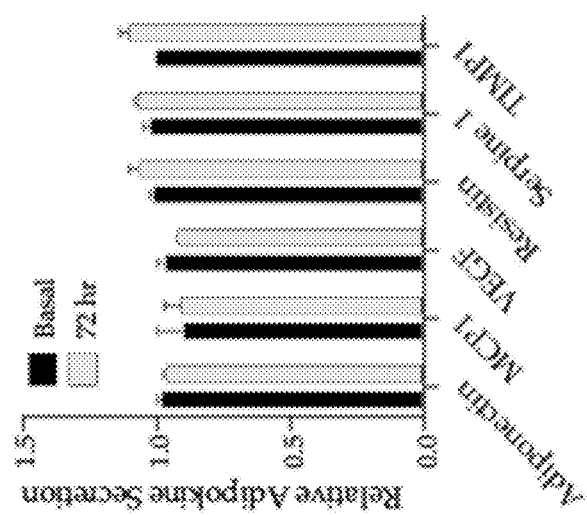
Figure 2G:
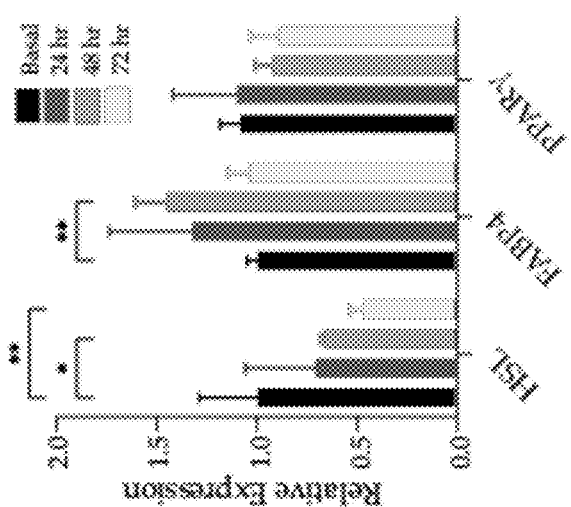

Mature (fully differentiated) adipocytes treated with AZD3965 also exhibited reduced lipid content over the course of AZD3965 treatment (FIGS. 2A, 2B). It was posited that this decrease in lipid droplet content could be the result of a decrease in lipogenesis, an increase in lipolysis, or adipocyte de-differentiation, a process that has been described by others (Dodson, M V, et al. Int. J. stem cells 2011 4:76; Shen, J, et al. Int. J. Oral Sci. 2011 3:117-124) involving a rapid 'liposecretion' event (Côté, J A, et al. Cell Tissue Res. 2019 378:385-398). To gain insight into the mechanisms that are governed by MCT1 inhibition, changes in NADP+ (H) bioavailability (a critical factor for lipogenesis), intracellular glycerol content (the major product of lipolysis), adipokine secretion, as well as transcript levels and protein expression of the previously mentioned adipogenic proteins were assessed. MCT1 inhibition significantly reduced intracellular concentrations of both reduced and oxidized forms of NADP+ (H), yet this decrease was marginal with a less than 15% decrease observed (FIG. 2D) suggesting that other mechanisms could contribute to the significant decrease in lipid observed following MCT1 inhibition in adipocytes (FIGS. 2A, 2B). Indeed, when AZD3965 treated adipocytes were probed for changes in lipolysis, MCT1 inhibition led to a large increase in intracellular glycerol and thus, an increase in cellular lipolysis (FIG. 2E). Although this increase in lipolysis could account for the decrease in adipocyte lipid content, it was critical to rule out the possibility of adipocyte dedifferentiation by assessing changes in transcript levels and expression of adipogenic proteins, and adipokine secretion.

Figure 2F:
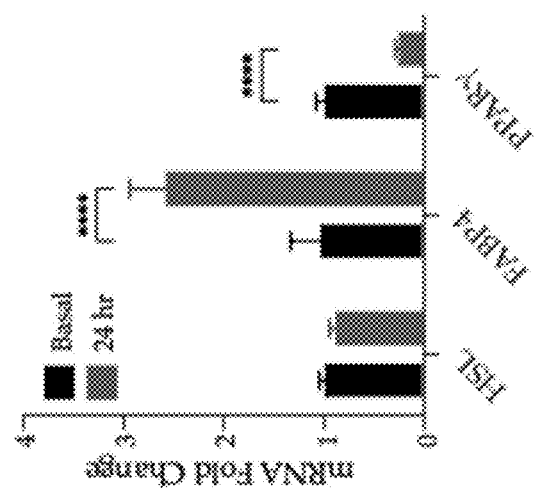

RT-qPCR analysis revealed that the mRNA levels for PPARγ and HSL were both significantly decreased following 24 hr of AZD3965 treatment (FIG. 2F). This was reflected at the protein level by a decrease in HSL protein expression following 72 hr of MCT1 inhibitor treatment; however, no changes in PPARγ expression were observed (FIG. 2G). Conversely, FABP4 mRNA and protein expression were significantly increased following 24 hr and 48 hr of AZD3965 treatment, respectively (FIGS. 2F, 2G). Despite decreased HSL expression, maintained PPARγ and elevated FABP4 expression, suggests that adipocytes remain differentiated following MCT1 inhibition. To further establish that adipocytes remained differentiated following AZD3965 treatment, conditioned media collected from adipocytes pretreated with or without AZD3965 for 72 hr were subjected to an adipokine antibody array. No significant changes in adipokine secretion following MCT1 inhibition were detected (FIG. 2H) supporting the notion that de-differentiation does not occur. Taken together, these results suggest that an increase in lipolysis following AZD3965 treatment accounts, at least in part, for the observed decrease in lipid content.

The acute physiological consequence of MCT1 inhibition is intracellular lactate accumulation owing to the cells' inability to export lactate via its primary transporter. Therefore, changes in intracellular lactate in adipocytes following incubation with AZD3965 at discrete time points ranging from 15 min to 24 hr were monitored. Indeed, treatment with the MCT1 inhibitor rapidly increased intracellular lactate; however, after prolonged exposure to AZD3965 this effect was greatly diminished (FIG. 3A). To explore the potential fates of lactate which can be metabolized through its oxidation into pyruvate or complete oxidation by the mitochondria, intracellular pyruvate and the NAD+/NADH ratio were also monitored over the same time course. An acute, significant increase in intracellular pyruvate was observed (FIG. 3B) as was a significant decrease in the relative NAD+/NADH ratio (FIG. 3C). This decrease in NAD+/NADH ratio indicates that there is an increase in intracellular lactate relative to pyruvate and that MCT1 inhibition induces reductive stress. This observation is in agreement with the finding that elevated levels of intracellular lactate also induces redox stress in adipocytes as reported by others (Carrière, A, et al. J. Physiol. Biochem. 2020 76:241-250). Taken together, these results suggest that although there is an increase in both lactate and pyruvate, the increase in lactate is more robust; therefore, it is unlikely that excess lactate is oxidized back into pyruvate and rather, may be oxidized directly by the mitochondria.

To gain insight into the transcriptional and molecular processes influenced by MCT1 inhibition, transcriptomic analysis (RNA-seq) was performed on mature adipocytes treated with or without AZD3965 for 24 hr. 277 differentially expressed genes (DEGs) were identified through comparison of the gene expression profiles from the treated versus untreated adipocytes. Molecular functions analysis in IPA revealed a transcriptional signature characterized by the upregulation of mRNAs related to the progression of cell cycle (FIGS. 3D, 3E). Previously, it has been suggested that mature adipocytes may retain the ability to re-enter the cell cycle and proliferate. Evidence of this phenomenon comes from Xu et al. who recently captured adipocyte proliferation on a phase contrast microscope (Xu, P, et al. FEBS Open Bio 2017 7:652-658). While the low resolution of these videos leaves unanswered questions as to the mechanism of proliferation (i.e., de-differentiation or direct division of adipocytes), it is clear that cells with lipid droplets do retain the capacity to divide. To explore the possibility that MCT1 inhibition could promote re-entry of the mature adipocytes into the cell cycle as suggested by our transcriptomic analysis, mRNA levels of well characterized, cell cycle promoting genes were assessed, revealing a significant increase in transcript levels of proliferation markers, CDK1 (cyclin-dependent kinase 1), PLK1 (polo-like kinase 1), TOP2a (DNA topoisomerase alpha) and cyclin B following AZD3965 treatment (FIG. 4A). Furthermore, the active form of CDK1, a central regulator that drives cells through the cell cycle (Ding, L, et al. Int. J. Mol. Sci. 2020 21:1960), was found to be increased following MCT1 inhibition (FIGS. 4B, 4C).

When probed directly, it was shown that MCT1 inhibition promoted adipocyte proliferation specifically in differentiated 3T3-L1 cells, but not in preadipocytes or 3T3-L1-shMCT1 cells (FIG. 4D, 4E). To visualize this proliferation, an immunocytochemistry experiment probing the expression of the proliferation marker, Ki67, following 24 hr treatment with AZD3965 was performed and quantified. Ki67 expression was observed in cells containing lipid droplets and was significantly increased in MCT1 inhibitor treated cells (FIGS. 4F, 4G, 4H). These findings strongly support the premise that mature, lipid laden adipocytes re-enter the cell cycle following MCT1 inhibition. However, it is possible that these results could represent endoreplication resulting in polyploidy, rather than proliferation. Indeed, it has been demonstrated that differentiated 3T3-L1 adipocytes can become multi-nucleated (Xu, P, et al. FEBS Open Bio 2017 7:652-658).

As proliferation in mature adipocytes is a recently recognized mechanism of insulin sensitizing that accompanies hyperplasia, insulin-stimulated glucose uptake was assessed following MCT1 inhibitor treatment. Following up to 72 hr of inhibitor treatment, no significant changes in basal, non-insulin stimulated glucose uptake were observed in WT 3T3-L1 cells (FIG. 5A) or shMCT1 containing 3T3-L1 cells (FIG. 5D). However, unlike shMCT1, 3T3-L1 cells showed a significant increase in insulin-stimulated glucose uptake following ≥48 hr of AZD3965 (1 μM) treatment (FIGS. 5B, 5E). Moreover, it was shown that this effect was CDK1-dependent as it could be blocked with the addition of RO-3306, a small molecule CDK1 inhibitor (FIG. 5C). Evaluation of 3T3-L1-shMCT1 cells revealed that although these adipocytes are insulin responsive, insulin-stimulated glucose uptake is attenuated in these cells. As shScramble expressing 3T3-L1 cells showed insulin responsiveness similar to that of WT cells (FIG. 5F), it appears that MCT1 knockdown may interfere with the development of insulin sensitive, mature adipocytes.

The ability of MCT1 inhibition to enhance adipocyte lipid storage capacity (the physiological function of hyperplasia) was assessed. To probe change in adipocyte lipid storage capacity, intracellular triglycerides were quantified in adipocytes following pretreatment with or without AZD3965 for up to 72 hr. Indeed, adipocytes exposed to the MCT1 inhibitor for 24 hr, 48 hr and 72 hr all contained significantly more triglycerides than adipocytes which had not received AZD3965 pretreatment (FIG. 5G). Moreover, when cultured for 72 hr with 100 nM insulin, a potent activator of lipogenesis, adipocytes pretreated with the MCT1 inhibitor for 48 hr accumulated significantly more triglycerides compared to adipocytes which had not been exposed to AZD3965 (FIG. 5G). Adipocytes pretreated for 24 hr and 72 hr also trended toward an increase in triglyceride content; however, this increase did not reach statistical significance. As these adipocytes were incubated with insulin, it is also possible that they may have reached their hypertrophic capacity limiting the ability of adipocytes to accumulate additional triglycerides.

Collectively, these data show that MCT1 inhibition has profound effects on adipocyte metabolism. Specifically, treatment with the MCT1 inhibitor AZD3965 enhances lipolysis, promotes adipocyte proliferation, augments insulin-stimulated glucose uptake and enhances triglyceride storage capacity providing compelling evidence that MCT1 inhibition may promote adipocyte hyperplasia. However, to fully elucidate the influence that MCT1 inhibition has on systemic metabolism and the potential therapeutic benefit of AZD3965 in the context of metabolic disease, additional in vitro and in vivo experiments characterizing changes in adipose tissue morphology and metabolism, and systemic metabolism are required. As previously mentioned, AZD3965 is currently in clinical trials (NCT01791595) for advanced cancers. This trial represents the first time in patients for this class of drug to define the maximum tolerated dose and proof of mechanism. The expansion of adipose tissue mass by excessive hypertrophy and ectopic lipid accumulation are major contributors to metabolic disease in obesity. By contrast, promoting expansion of adipose tissue through hyperplasia has the potential to redistribute excess lipid between newly differentiated adipocytes with enhanced insulin sensitivity and lipid storage capacity. Thus, improving adipocyte function via MCT1 inhibition induced hyperplasia may provide a novel therapeutic strategy for obesity and related metabolic disorders.

Materials and Methods

Cell Culture: 3T3-L1 cells (ATCC® CRL-173™) were cultured in 'complete media' containing Dulbecco's DMEM with 10% iron fortified, calf serum (ATCC® 30-2030™) and 1% Pen-Strep. All cells were maintained at 37° C. with 5% $CO_2$ atmosphere in a humidified incubator. Media was renewed every 2 days and cells were passaged by splitting at a 1:10 ratio to ensure confluency did not exceed 80%. Cells were maintained below passage 8.

Cell Line Development: Lenti plasmid vectors containing shRNA targeting MCT1 or a shScramble sequence were purchased from Genocopia. Lentiviral particles were produced using HEK293T cells and a third-generation packaging system, MISSION Lentiviral Packaging Mix, as per manufacturer's (Sigma-Aldrich) recommendations. To generate shMCT1 cells, 3T3-L1 cells were seeded and transduced with optimized titers of freshly harvested lentivirus. 12 hr after transduction, medium was changed, and cells were allowed to recover for 24 h before being placed under antibiotic selection (2 μg/mL puromycin [Clontech]) for 3-6 days. Cells surviving antibiotic selection were harvested for both reverse transcription quantitative chain polymerase reaction (RT-qPCR) and immunoblotting analyses.

Differentiation Protocol: The 3T3-L1 differentiation protocol was adapted from Green and Meuth (1974) (Zebisch, K, et al. Anal. Biochem. 2012 425:88-90; Green, H, et al. Cell 1974 3:127-133). Cells were seeded at approximately 80% confluency and allowed to reach confluency prior to induction of differentiation. 1-2 days post confluency, growth media was changed to 'day 0' media consisting of media supplemented with 0.5 mM 1-methyl-3-isobutyl xanthine (IBMX), 1 M dexamethasone, and 10 μg/mL insulin. On 'day 3' media was changed to growth media with 10 μg/mL insulin only, and on 'day 6' media was replaced with normal growth media. After day 6, the complete media was refreshed every 2 days. Using Oil Red O staining, RT-qPCR and immunoblotting, it was determined that 3T3-L1 cells were fully differentiated into lipid-laden adipocytes by 'day 8' of the protocol, as reported by others (Petersen, C, et al. Sci. Rep. 2017 7:13101; Mangum, L H, et al. Toxicol. Lett. 2015 238:65-71). All differentiation experiments were performed on cells between passage 4 and 6 to ensure differentiation efficiency was consistent.

Oil Red O Staining: Cells were then fixed with 4% PFA for 10 minutes. After fixation, PFA was removed; cells washed 3× with PBS and allowed to dry completely. The lipid-specific stain Oil Red-O was dissolved in isopropanol to a concentration of 12 mM was filtered with a 0.2-micron filter and further diluted 6:4 with distilled water. Following 20 minutes of incubation, the stain solution was filtered again (0.2-micron filter) and added to fixed cells for 10 minutes. Subsequently stain was then removed, and cells were washed thoroughly with distilled water. 10× images of cells were taken from randomized fields of view with the Cytation 5 Cell Imaging Multi-Mode reader (BioTek Instruments). Lipid content was also quantified on the Cytation 5.

RT-qPCR: RNA was harvested from preadipocytes using the RNeasy® Plus Mini Kit as per manufacturer's recommendations (Qiagen). For differentiated adipocytes, RNA was collected and isolated using TRIzol (Thermo Fisher Scientific) according to the manufacturer's instructions. Quantification of RNA was performed using the Nanodrop 1000 Spectrophotometer. RNA (2 μg) was reverse transcribed using Superscript III First Strand synthesis kit (Invitrogen). RT-qPCR detection with SYBR green was performed with the resulting cDNA and a 50/50 forward primer: reverse primer ratio using the QuantStudio™ 5 (Applied Biosystems™). Oligonucleotide primer sequences used in this study can be found in the table below.

Immunoblotting: For the collection of membrane bound proteins (i.e., MCT1), cells were lysed and the membrane fraction of protein was isolated as previously described (Sadler, J B A, et al. Preparation of a total membrane fraction from 3T3-L1 adipocytes (Cold Spring Harb. Protoc. 2016, 2016, pdb-prot083675). Briefly, cells were lysed with ice cold HES buffer (250 mM sucrose, 20 mM HEPES, 1 mM EDTA, pH7.4) containing a cocktail of protease and phosphatase inhibitors (Roche Diagnostic) and centrifuged for 5 min (500 g at 4° C.) to pellet out nuclei. The remaining supernatant (containing cytosolic and membrane bound proteins) was collected. For all other immunoblotting experiments, RIPA lysis buffer containing protease and phosphatase inhibitors was used, and protein was isolated via centrifugation at 17,000 g for 10 min at 4° C. For all samples, protein concentration of the lysates was measured using the BCA Protein Assay Kit (Pierce Biotechnologies). Diluted lysates were added to Laemmli sample buffer and denatured at 95° C. for 5 min. After sample preparation, proteins were resolved via SDS-polyacrylamide gel electrophoresis (4-12%) using NuPAGE 4-12% Bis-Tris gels (Invitrogen), and transferred to nitrocellulose membranes. Blots were placed in blocking buffer (LI-COR Biosciences) and incubated overnight at 4° C. with primary antibodies at the recommended dilution. Blots were washed 3 times (5 minutes per wash) in TBST (20 mM Tris, pH 7.6, 140 mM NaCl, and 0.1% Tween-20), and then incubated with the appropriate IRDye-conjugated secondary antibody (LI-COR Biosciences) diluted in blocking buffer and incubated at room temperature for an hr. After 3 washes (5 min per wash) with TBST, blots were revealed using the LI-COR Odyssey CLx system. Bands were quantified using Image Studio™ (LI-COR Biosciences).

Cell Viability: 3T3-L1 cells were seeded and differentiated in white, clear bottom, 384-well plates (Corning®). Following differentiation, adipocytes were treated for 24, 48 or 72 hr with varying concentrations of AZD3965 ranging from 0.1 nM to 10 UM. Following the indicated incubation period, cells were assayed with CytoTox-Glo™ (Promega®) according the manufacturer's instructions to assess cell toxicity. Briefly, this assay is a luminescent cytotoxicity kit that measures the relative number of dead cells in a population through the addition of a cell impermeant luminogenic substrate which luminesces in the presence of 'dead-cell protease', a protein released from membrane-compromised, dead cells. Luminescence was read on a spectrophotometer (FlexStation 3; Molecular Devices). The data generated were normalized by dividing the relative luminescence units (RLU) collected for each experimental condition by the average RLU of 'basal' untreated cells considered to be 100% viable.

NADP++NADPH Bioavailability: 3T3-L1 cells were seeded, differentiated and treated with or without AZD3965 (1 μM) for up to 72 hr in clear 96 well plates (Corning®). Following treatment, the NADP+/NADPH-Glo™ (Promega®) kit was used to measure the total NADP++NADPH concentration within each sample according to the manufacturer's instructions. In the presence of either NADP+ or NADPH, an enzyme 'Reductase' reduces a pro-luciferin reductase substrate to form luciferin which emits a luminescent signal directly proportional to the quantity of NADP+ and NADPH. Luminescence was read on a spectrophotometer (FlexStation 3; Molecular Devices).

Lipolysis (Intracellular Glycerol): 3T3-L1 cells were seeded, differentiated and treated with or without AZD3965 (1 μM) for up to 72 hr in clear 96 well plates (Corning®). After media removal and washing cells with PBS, the Glycerol-Glo™ (Promega®) assay kit was used to assess changes in lipolysis through the quantification of intracellular glycerol according to the manufacturer's instructions. A luminescent signal is produced that is proportional to the amount of glycerol within the sample Luminescence was read on a spectrophotometer (FlexStation 3; Molecular Devices).

Adipokine Antibody Array: 3T3-L1 cells were differentiated and treated with or without AZD3965 for 72 hr. After this incubation, media was replenished, and adipocytes were cultured for an additional 24 hr to allow for adipokine secretion and media conditioning. Media was collected and analyzed for adipokine secretion with the Proteome Profiler Mouse Adipokine Array Kit (R&D Systems) according to the manufacturer's instructions. Chemiluminescence was detected with the LI-COR Odyssey® XF Imaging System with a 2 minute exposure time. Positive signals were quantified using Image Studio™ (LI-COR Biosciences) to quantify signal intensity. Data presented represent signal intensity normalized by the signal intensity of reference antibodies within the array.

Intracellular Lactate: Intracellular lactate was measured using the Lactate-Glo™ Assay Kit (Promega®) according to the manufacturer's instructions. 3T3-L1 cells were seeded and differentiated in white clear bottom 96-well plates (Corning®). After differentiation, cells were treated with compound or vehicle as indicated. Following 15 min, 30 min, 1 hr, 4 hr, 8 hr or 24 hr incubation with 1 M AZD6965, media was removed, and cells were lysed. Lysates were then subjected to a proprietary enzymatic reaction coupling lactate oxidation and NADH production with a bioluminescent detection system supplied by the Lactate-Glo™ Assay kit, and luminescence was read on a spectrophotometer (FlexStation 3; Molecular Devices). The data generated were normalized by dividing the relative luminescence units (RLU) collected for each experimental condition by the average RLU of vehicle control.

Intracellular Pyruvate: Intracellular pyruvate was measured using the Amplite™ Fluorimetric Pyruvate Assay Kit (AAT Bioquest) according to the manufacturer's instructions. 3T3-L1 cells were seeded and differentiated in white clear bottom 96-well plates (Corning®). After differentiation, cells were treated with compound or vehicle as indicated. Following 15 min, 30 min, 1 hr, 4 hr, 8 hr or 24 hr incubation with 1 μM AZD6965, media was removed, and cells were lysed with ReadiUse™ mammalian cell lysis buffer (AAT Bioquest). Lysates were then subjected to an enzyme-coupled reaction with the Quest Fluor™ Pyruvate Sensor resulting in an absorbance signal detected at 575 nm which is proportional to the quantity of pyruvate within the sample. Absorbance was read on a spectrophotometer (FlexStation 3; Molecular Devices).

NAD+/NADH Ratio: 3T3-L1 cells were seeded, differentiated and treated with or without AZD3965 (1 µM) for 15 min, 30 min, 1 hr, 4 hr, 8 hr or 24 hr in clear 96 well plates (Corning®). Following incubation with the compound, the NAD+/NADH-Glo™ (Promega®) kit was used to measure both the NAD+ and NADH concentrations within each sample according to the manufacturer's protocol. Briefly, samples were lysed and split into 2 separate white 96 well plates (Corning®). One plate was treated with a strong acid (0.4N HCl) to eliminate NADH in the sample while the other plate was treated with a strong base (0.2N NaOH) to eliminate NAD+, and both plates were incubated at 60° C. for 15 minutes. Samples were then neutralized and subjected to the NAD+/NADH-Glo™ assay. Within this assay, in the presence of NAD+ or NADH, an enzyme 'Reductase' reduces a pro-luciferin reductase substrate to form luciferin which emits a luminescent signal directly proportional to the quantity of NAD+ or NADH within the sample. Luminescence was read on a spectrophotometer (FlexStation 3; Molecular Devices). To calculate the NAD+/NADH ratio for each sample, luminescence from acid-treated samples, (reflecting NAD+level), was divided by the luminescence signal from the corresponding base-treated samples (reflecting NADH levels).

RNA-Seq: 3T3-L1 cells were seeded in 10 $cm^2$ dishes at 70% confluency and subjected to differentiation for 8 days. Differentiated cells were treated with vehicle (DMSO) or MCT1 inhibitor (1 µM AZD6965) for 24 hr. Following treatment, cells were collected, and RNA was isolated using TRIzol (Thermo Fisher Scientific) according to the manufacturer's protocol. Subsequently, RNA samples were purified using the RNeasy® Plus Mini Kit RNA clean up protocol as per manufacturer's (Qiagen) recommendations. Quantification of RNA was performed using the Nanodrop 1000 Spectrophotometer. All RNA samples were shipped to Novogene for mRNA sequencing (RNA-seq) using the Illumina NovaSeq plat-form with paired-end 150 bp (PE 150) sequencing and data quality control strategy. The raw reads were then aligned and mapped to the mm 10 mouse reference genome (build mm 10), using STAR (Spliced Transcripts Alignment to a Reference) software. The total mapping rate was over 80% for all samples in the data set. Gene expression level was quantified by calculating FPKM (Fragments Per Kilobase of transcript sequence per Millions base pairs sequenced) from the STAR mapping files. Differential expression analysis was performed using the R package DESeq2. p values generated by multiple binomial tests were adjusted with the Benjamini and Hochberg approach for controlling false discovery and reported as the adjusted p value (padj). The threshold for statistical significance was defined as padj<0.05.

Ingenuity® Pathway Analysis (IPA): For pathway analysis, changes in transcript FPKM and significance values resulting from the RNA-seq experiment were uploaded and processed by IPA software licensed from Ingenuity® Systems. After each annotated gene was mapped to its corresponding gene object in the IPA Knowledge Base, molecular functions analysis was performed to identify significantly (padj<0.05) altered biological functions.

Confocal Microscopy: Cells were seeded and differentiated on 8 chamber µ-Slides (Ibidi®). Differentiated cells treated with vehicle (DMSO) or 1 µM AZD3965 for 24 hr were fixed in 4% PFA for 10 min at room temperature, permeabilized with 0.1% Triton™ X-100 in PBS and blocked with 3% BSA in PBS for an hr. Cells were subsequently incubated with Ki67 antibody (NBP2-22112, Novus Biologicals) at a 1:500 dilution in PBS 3% BSA overnight at 4° C. Cells were washed with PBS and incubated with goat anti-rabbit Alexa Fluor 647 secondary antibody (Invitrogen) at 1:2000 dilution in PBS 3% BSA for 1 hr. Lipid droplets were stained with BODIPY® (Invitrogen) for 20 min at room temperature according to the manufacturer's recommendations. Nuclei were stained for 20 min at room temperature with 4,6-diamidino-2-phenylindole (DAPI) (Sigma-Aldrich) in PBS 3% BSA, diluted at 1:5000 from a 1 mg/ml stock. Images were acquired on the Leica TCS SP8 laser scanning confocal microscope Leica Microsystems) at a magnification of 630× with 3× zoom.

Ki67 Expression Quantification: Slides were prepared as outlined in 'Confocal Microscopy', After staining, Ki67 expression was imaged and analyzed on the Cytation 5 Cell Imaging Multi-Mode reader (BioTek Instruments) through the measure of fluorescence intensity and deep red fluorescent (Alexa647) positive pixels. This value was then normalized by the total number of nuclei as indicated by DAPI staining and the 'cell counting' image analysis program on the Cytation 5 resulting in the average Ki67 expression per cell for each 1000 nuclei captured in 12 randomized images per condition at 10× magnification.

Proliferation: 3T3-L1 cells were seeded and differentiated in black clear bottom 96-well plates (Corning®). After differentiation, wells were treated with vehicle or AZD3965 concentrations ranging from 10 nM to 10 UM for 24 hr, 48 hr or 72 hr as indicated. Cell viability was measured at the end of each treatment time using the CyQUANT™ NF Cell Proliferation assay (Invitrogen™) according to the manufacturer's protocols.

Figure 7:
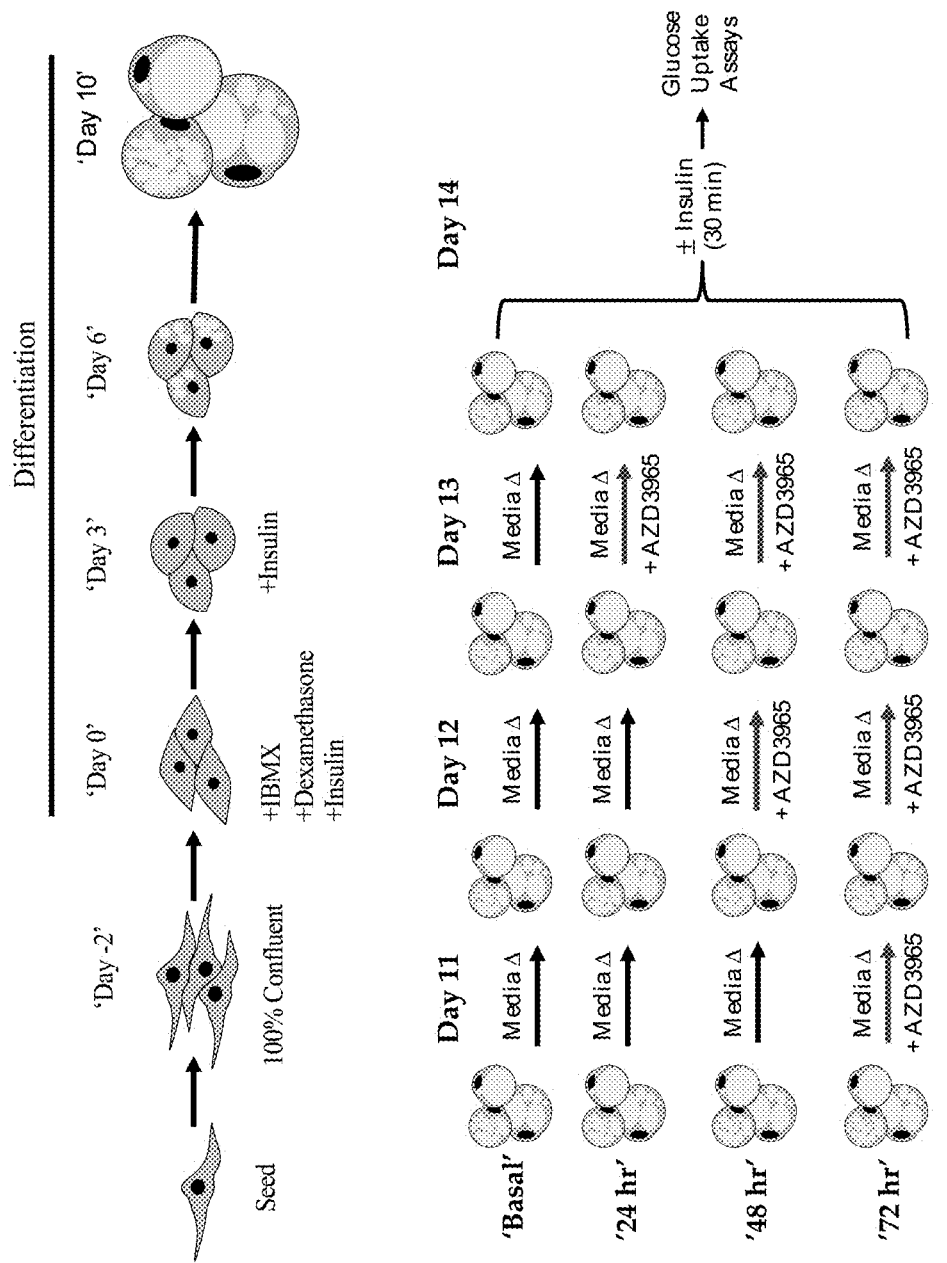
FIG. 7. Schematic Overview of Experimental Procedure. This figure outlines how all glucose uptake experiments were performed as seen in FIG. 5.

Glucose Uptake: 3T3-L1 cells were seeded and differentiated in clear bottom 96-well plates (Corning®). After differentiation, cells were treated with or without 1 M AZD3965 for 24 hr, 48 hr or 72 hr as illustrated in FIG. 7 (schematic outline of experimental procedure). The cells were incubated in serum free media the night before performing the assay. The following day/morning, media was changed to serum and glucose free media for 2 hr prior to the experiment. Cells were then stimulated with 175 nM Insulin or vehicle (PBS) for 30 minutes. Glucose Uptake was measured using the Glucose Uptake-Glo™ Assay (Promega®) according to the manufacturer's protocol. The data generated were normalized by dividing the relative luminescence units (RLU) measured in insulin stimulated wells by vehicle treated controls. The aforementioned experiment was repeated in the presence of the CDK1 inhibitor, RO-3306 (10 µM), where indicated (FIG. 5C).

Hyperplasia (Intracellular Triglycerides): 3T3-L1 cells were seeded and differentiated in clear bottom 96-well plates (Corning®). After differentiation, cells were treated with or without 1 µM AZD3965 for 24 hr, 48 hr or 72 hr. After compound incubation, media was changed to normal growth media with or without 100 nM insulin and cultured for an additional 72 hrs. Upon completion of the second incubation period, adipocytes were lysed and subjected to the Triglyceride-Glo™ Assay (Promega®) according to the manufacturer's instructions. The luminescent signal produced is proportional to the amount of triglycerides detected within the sample. Luminescence was read on a spectrophotometer (FlexStation 3; Molecular Devices).

Statistics: Data analysis was performed using Prism 8 software (GraphPad Software Inc.). All statistical significance was generated based on student's t-test or one way ANOVA as appropriate for multiple comparisons and a significance value of at least $p<0.05$. Unless otherwise stated, all data represents the average of 3 experimental replicates±the standard error of the mean (SEM).

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

The invention claimed is:

1. A method for promoting insulin sensitivity in a subject with insulin resistance, comprising administering to the adipose tissue of the subject a therapeutically effective amount of a composition comprising AZD3965 (5-[[(4S)-4-hydroxy-4-methyl-2-isoxazolidinyl]carbonyl]-3-methyl-1-(1-methylethyl)-6-[[5-methyl-3-(trifluoromethyl)-1H-pyrazol-4-yl]methyl]-thieno[2,3-d]pyrimidine-2,4 (1H, 3H)-dione).

2. The method of claim 1, wherein the subject is a human.

3. The method of claim 1, wherein the subject is suffering from diet-induced insulin resistance.

4. The method of claim 1, wherein the insulin resistance is associated with type II diabetes.

5. The method of claim 1, wherein the insulin resistance is associated with obesity.

6. The method of claim 1, wherein the insulin resistance is associated with coronary artery disease, renal dysfunction, atherosclerosis, hyperlipidemia, essential hypertension, or fatty liver.

7. The method of claim 1, wherein the subject has been diagnosed with drug-induced insulin resistance.

8. The method of claim 1, wherein the AZD3965 is administered prior to the onset of type II diabetes.

9. The method of claim 1, wherein the subject has not been diagnosed with a cancer.

10. The method of claim 1, wherein the subject has been diagnosed with cancer cachexia.

* * * * *